(12) United States Patent
Bei et al.

(10) Patent No.: US 10,819,187 B2
(45) Date of Patent: Oct. 27, 2020

(54) SYSTEM, KIT, AND METHOD FOR DISSIPATING HEAT GENERATED BY A MOTOR ASSEMBLY

(71) Applicant: SZ DJI TECHNOLOGY CO., LTD., Shenzhen, Guangdong (CN)

(72) Inventors: Shimeng Bei, Guangdong (CN); Xumin Wu, Guangdong (CN); Qiang Yu, Guangdong (CN); Jiyuan Ao, Guangdong (CN); Xiaolong Wu, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 51 days.

(21) Appl. No.: 15/356,273

(22) Filed: Nov. 18, 2016

(65) Prior Publication Data
US 2017/0070125 A1    Mar. 9, 2017

Related U.S. Application Data

(63) Continuation of application No. PCT/CN2015/080529, filed on Jun. 1, 2015.

(51) Int. Cl.
*H02K 9/06* (2006.01)
*H02K 5/20* (2006.01)
(Continued)

(52) U.S. Cl.
CPC ............ *H02K 9/06* (2013.01); *F04D 25/082* (2013.01); *H02K 5/20* (2013.01); *H02K 11/33* (2016.01);
(Continued)

(58) Field of Classification Search
CPC ........ F04D 25/082; H02K 9/06; H02K 11/33; H02K 9/02; H02K 9/04; H02K 11/30;
(Continued)

(56) References Cited

U.S. PATENT DOCUMENTS 3,449,605 A * 6/1969 Wilson ............... H02K 9/06
                                                       310/58
6,384,494 B1 * 5/2002 Avidano ............ H02K 9/06
                                                       310/58

(Continued)

FOREIGN PATENT DOCUMENTS

CN    102594023 A    7/2012
CN    202429355 U    9/2012
(Continued)

OTHER PUBLICATIONS

European Patent Office (EPO) The Extended European Search Report for 15874379.9 dated Jul. 7, 2017 8 Pages.
(Continued)

*Primary Examiner* — Quyen P Leung
*Assistant Examiner* — Eric Johnson
(74) *Attorney, Agent, or Firm* — Anova Law Group, PLLC

(57) ABSTRACT

A system and kit for dissipating heat generated by a motor assembly and methods for manufacturing and using same. The motor assembly includes a housing that defines an internal chamber. The internal chamber communicates with an air inlet and an air outlet each being formed in the housing, and can at least partially receive motor inner workings. A pump assembly can be included in the internal chamber for generating an air flow during operation of the motor assembly. The pump assembly can draw air into the internal chamber via the air inlet, generating an air flow within the internal chamber. The air drawn into the internal chamber is applied to the motor inner workings, and the air heated by the motor inner workings is expelled from the internal chamber via the air outlet. Thereby, the air flow advantageously can cool the motor assembly as the air traverses the internal chamber.

18 Claims, 25 Drawing Sheets

(51) Int. Cl.
*H02K 21/22* (2006.01)
*F04D 25/08* (2006.01)
*H02K 11/33* (2016.01)
*H02K 7/14* (2006.01)
*H02K 5/10* (2006.01)

(52) U.S. Cl.
CPC .............. *H02K 21/22* (2013.01); *H02K 5/10* (2013.01); *H02K 7/14* (2013.01)

(58) Field of Classification Search
CPC .. H02K 11/35; H02K 11/38; B64C 2201/042; B64C 39/024; A63H 27/12
See application file for complete search history.

(56) References Cited

U.S. PATENT DOCUMENTS

| | | | |
|---|---|---|---|
| 6,798,098 | B1 | 9/2004 | Tai |
| 8,026,644 | B2 | 9/2011 | Violett |
| 8,884,480 | B2* | 11/2014 | Pal .......................... F04D 25/08 310/61 |
| 2003/0057289 | A1* | 3/2003 | Smole ...................... F24F 7/00 236/49.3 |
| 2003/0142476 | A1* | 7/2003 | Tomioka ................. G06F 1/203 361/695 |
| 2006/0022529 | A1* | 2/2006 | De Filippis ........... F04D 25/082 310/58 |
| 2006/0073030 | A1* | 4/2006 | McAuliffe ............ F04D 25/082 417/366 |
| 2006/0078428 | A1* | 4/2006 | Zheng .................... F04D 17/04 415/206 |
| 2006/0181163 | A1* | 8/2006 | Lee ......................... H02K 9/06 310/62 |
| 2007/0273221 | A1 | 11/2007 | Kinoshita et al. |
| 2008/0260527 | A1* | 10/2008 | Aoki ................... F04D 29/4213 415/206 |
| 2009/0263238 | A1 | 10/2009 | Jarrah |
| 2010/0133932 | A1 | 6/2010 | Zhang |
| 2010/0148602 | A1 | 6/2010 | Parra |
| 2010/0231066 | A1* | 9/2010 | Korner .................... H02K 1/32 310/61 |
| 2011/0229358 | A1 | 9/2011 | Streng et al. |
| 2012/0266612 | A1 | 10/2012 | Jarrah |
| 2012/0299407 | A1* | 11/2012 | Miyama ................... H02K 5/18 310/63 |
| 2013/0320786 | A1* | 12/2013 | Isoda ....................... H02K 5/20 310/59 |
| 2014/0265739 | A1* | 9/2014 | Iwai ......................... H02K 9/06 310/60 R |
| 2015/0329191 | A1* | 11/2015 | Kiiskila ................... H02K 9/10 417/423.8 |
| 2016/0039529 | A1* | 2/2016 | Buchmueller ......... B64D 31/06 244/65 |
| 2016/0144954 | A1* | 5/2016 | Daigle .................. B64C 39/024 244/17.23 |
| 2018/0002023 | A1* | 1/2018 | Tian ....................... B64D 33/08 |

FOREIGN PATENT DOCUMENTS

| | | |
|---|---|---|
| CN | 202435193 U | 9/2012 |
| CN | 203135676 U | 8/2013 |
| CN | 203151310 U | 8/2013 |
| CN | 103754374 A | 4/2014 |
| CN | 203623964 U | 6/2014 |
| CN | 203933180 U | 11/2014 |
| CN | 204217293 U | 3/2015 |
| CN | 204243961 U | 4/2015 |
| CN | 204290620 U | 4/2015 |
| CN | 105518980 A | 4/2016 |
| CN | 205366054 U | 7/2016 |
| DE | 19515252 A1 | 11/1996 |
| DE | 102008010912 A1 | 8/2008 |
| EP | 1344541 A2 | 9/2003 |
| EP | 2369183 A1 | 9/2011 |
| EP | 2824332 A1 | 1/2015 |
| EP | 2894349 A1 | 7/2015 |
| JP | S59144336 A | 8/1984 |
| JP | 562250842 A | 10/1987 |
| JP | 2004523198 A | 7/2004 |
| JP | 2008521542 A | 6/2008 |
| JP | 2014076675 A | 5/2014 |
| JP | 2015019548 A | 1/2015 |
| RU | 2186255 C2 | 7/2002 |
| WO | 2005031948 A1 | 4/2005 |
| WO | WO 2005/124971 A1 | 12/2005 |
| WO | 2006001639 A1 | 1/2006 |
| WO | WO 2016/106711 A1 | 7/2016 |

OTHER PUBLICATIONS

WO, International Search Report and Written Opinion, PCT/CN2015/080529, dated Feb. 23, 2016.
World Intellectual Property Organization (WIPO) International Search Report for PCT/CN2014/095973 Oct. 10, 2015 6 Pages.

\* cited by examiner

SYSTEM, KIT, AND METHOD FOR DISSIPATING HEAT GENERATED BY A MOTOR ASSEMBLY

CROSS-REFERENCE TO RELATED APPLICATIONS

This application is a continuation of, and claims priority to, copending PCT Patent Application Number PCT/CN2015/080529, which was filed on Jun. 1, 2015. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to heat dissipation and more particularly, but not exclusively, to systems, kits, and methods for dissipating heat generated by motor assemblies.

BACKGROUND

Mobile platforms, such as manned and unmanned vehicles, can be used for performing surveillance, reconnaissance, and exploration tasks for military and civilian applications. For example, an unmanned aerial vehicle (UAV) may be outfitted with a functional payload, such as sensors for collecting data from the surrounding environment, or a substance to be delivered to a destination.

Generally, a mobile platform includes a motor for enabling the mobile platform to move. The motor needs to be lightweight in order to be energy efficient. Further, the motor can generate heat during an operation of the mobile platform, and the heat needs to be dissipated to prevent the motor from over-heating. Still further, during operation of the mobile platform, the motor needs to be resistant to dust, moist, corrosion and other elements in the operating environment.

However, existing design of motors often do not satisfy the above criteria. For example, to reduce the weight of the motor, structural components of the motor can have open slots such as weight-reduction holes and weight-reduction grooves. For dissipating heat, structural components of the motor can have open slots functioning as heat dissipation holes. However, open slots can reduce the motor's resistance to dust, moist, and corrosion. On the other hand, a motor having desired resistance to dust, moist, and corrosion can have poor heat dissipation performance. For improved heat dissipation, additional cooling equipment needs to be installed with the motor and can add significant weight to the motor.

In view of the foregoing, there is a need for a motor that can simultaneously have a light weight, desired heat dissipation, and strong resistance to dust, moist, and corrosion. Such a motor can overcome the aforementioned obstacles and deficiencies of currently-available motor designs.

BRIEF DESCRIPTION OF THE DRAWINGS

FIG. 30 is a detail drawing of another alternative embodiment of the motor assembly of FIG. 29, wherein a side view of the motor assembly is shown.

FIG. 31 is a detail drawing of another alternative embodiment of the motor assembly of FIG. 29, wherein a cross-sectional side view of the motor assembly is shown.

FIG. 32 is a detail drawing of another alternative embodiment of the motor assembly of FIG. 29, wherein a top view of the motor assembly is shown.

Figure 1:
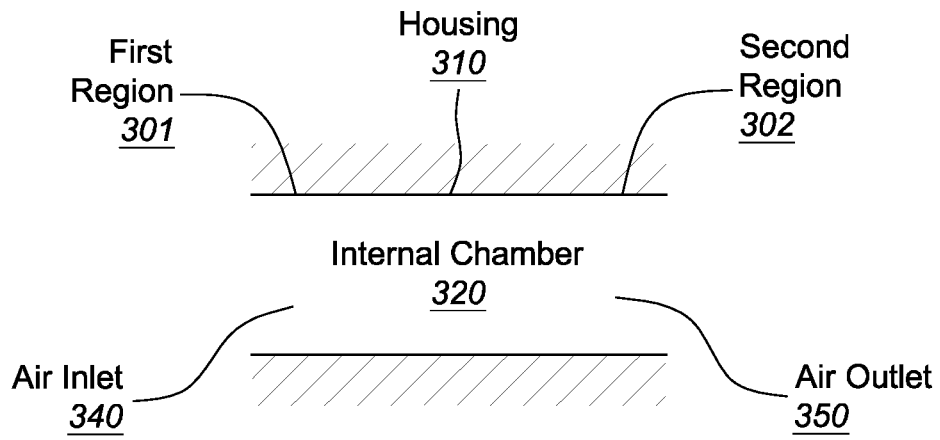
FIG. 1 is a top level diagram illustrating a housing suitable for dissipating heat.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available motor designs are incapable of providing a motor that can simultaneously have a light weight, desired heat dissipation, and strong resistance to dust, moist, and corrosion, a method and motor assembly that optimizes motor weight, heat dissipation and resistance to dust, moist, and corrosion can prove desirable and provide a basis for a wide range of motor applications, such as mobile platforms operating in a harsh environment. For example, such methods and motor assemblies can enable a mobile platform to operate in a dusty, corrosive and/or humid environment that requires electrical components being air sealed in a housing. This result can be achieved, according to one embodiment disclosed herein, by a housing 310 as illustrated in FIG. 1.

FIG. 1 is a top level diagram illustrating a housing 310 suitable for dissipating heat. The housing 310 can define an internal chamber 320, i.e., a cavity within the housing 310. The internal chamber 320 can be defined by the housing 310 in any conventional manner. For example, the housing 310 can enclose any side of the internal chamber 320. The internal chamber 320 preferably has a first region 301 and a second region 302. The first region 301 of the internal chamber 320 can communicate with an air inlet 340 that is formed in the housing 310; whereas, the second region 302 of the internal chamber 320 can communicate with an air outlet 350 that is formed in the housing 310. The internal chamber 320 thereby can communicate with the air inlet 340 (or motor air inlet 340) and the air outlet 350 (or motor air outlet 350). Stated somewhat differently, the internal chamber 320 can form a channel between the air inlet 340 and the air outlet 350 such that air that is received via the air inlet 340 can traverse the channel and be expelled via the air outlet 350. Although shown in FIG. 1 as being positioned on proximal and distal end regions of the housing 310, respectively, for purposes of illustration only, the first and second regions, 301 and 302, can be positioned on any suitable region of the housing 310.

Figure 2:
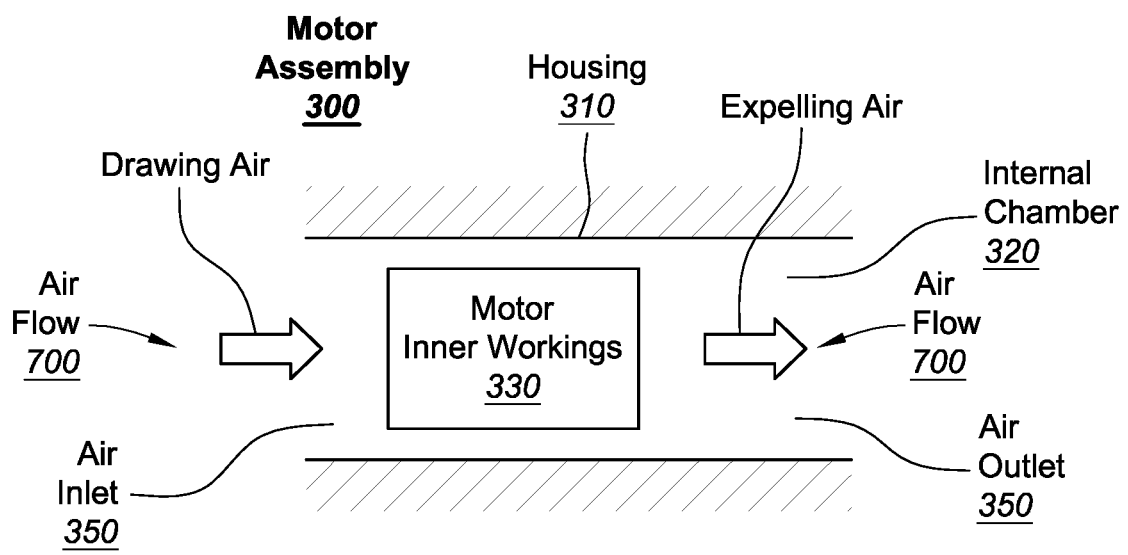
FIG. 2 is a top level diagram illustrating an embodiment of a motor assembly with the housing of FIG. 1, wherein the motor assembly is suitable for dissipating heat.

The housing 310 can define the internal chamber 320 with any suitable shape, size and/or dimension. Turning to FIG. 2, for example, the internal chamber 320 can be provided with a shape, size and/or dimension for at least partially receiving motor inner workings 330. The motor inner workings 330, when at least partially received by the internal chamber 320 of the housing 310, is suitable for dissipating heat generated by the motor assembly 300 during operation. The motor assembly 300 can include the housing 310. The motor inner workings 330 can be positioned at least partially within the internal chamber 320 during operation.

As shown in FIG. 2, the motor assembly 300 can include the motor inner workings 330 at least partially located within the internal chamber 320. For example, the motor assembly 300 can include a brushless electric motor, a brushed electric motor, and/or the like. For example, the motor assembly 300 can include any mechanical and/or electrical components, e.g., a rotor and/or a stator, that are capable of generating motion. The motor inner workings 330 can include one or more components of the motor assembly 300 that is at least partially located in the internal chamber 320. In one embodiment, the motor inner workings 330 can include the rotor and/or the stator.

As shown in FIG. 2, the motor assembly 300 can generate an air flow 700 that traverses the internal chamber 320. The motor assembly 300 can be configured to draw air into the internal chamber 320 via the air inlet 340. The motor assembly 300 likewise can be configured to expel the air out of the internal chamber 320 via the air outlet 350. The air flow 700 can be heated by the motor assembly 300, and thus dissipate heat generated by the motor assembly 300 during operation.

Further, in another embodiment, though not shown in FIG. 2, a portion of the motor inner workings 330 can constitute a portion of the housing 310. For example, a component of the motor inner workings 330 such as a magnetic yoke or a rotor can form a wall of the housing 310. Thus, the motor inner workings 330 may not be entirely located within the internal chamber 320, and a portion of the motor inner workings 330 may constitute a portion of the housing 310.

Definition of a "motor" according to the present disclosure is not limited. In some embodiments, a "motor" can refer to the motor assembly 300. In other embodiments, a "motor" can refer to the motor inner workings 330.

Figure 3:
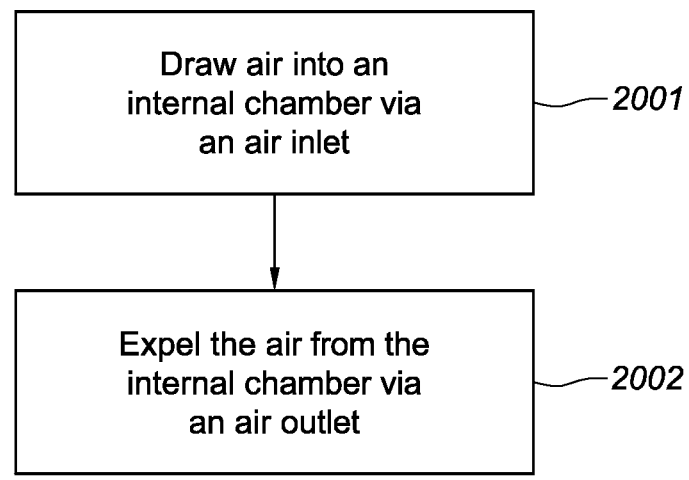
FIG. 3 is a top level flow chart illustrating an embodiment of a method for dissipating heat in the motor assembly of FIG. 2.

FIG. 3 is a top level flow chart illustrating an embodiment of a method 2000 for dissipating heat generated by the motor assembly 300. The method 2000 can dissipate heat by transferring the air in the housing 310 of the motor assembly 300 in the manner discussed above with reference to FIGS. 1 and 2.

As shown in FIG. 3, the air is drawn, at 2001, into the internal chamber 320 via the air inlet 340. The air can be expelled, at 2002, from the internal chamber 320 via the air outlet 350. Embodiments of the method 2000 are further illustrated in the present disclosure by referring to FIG. 4.

Figure 4:
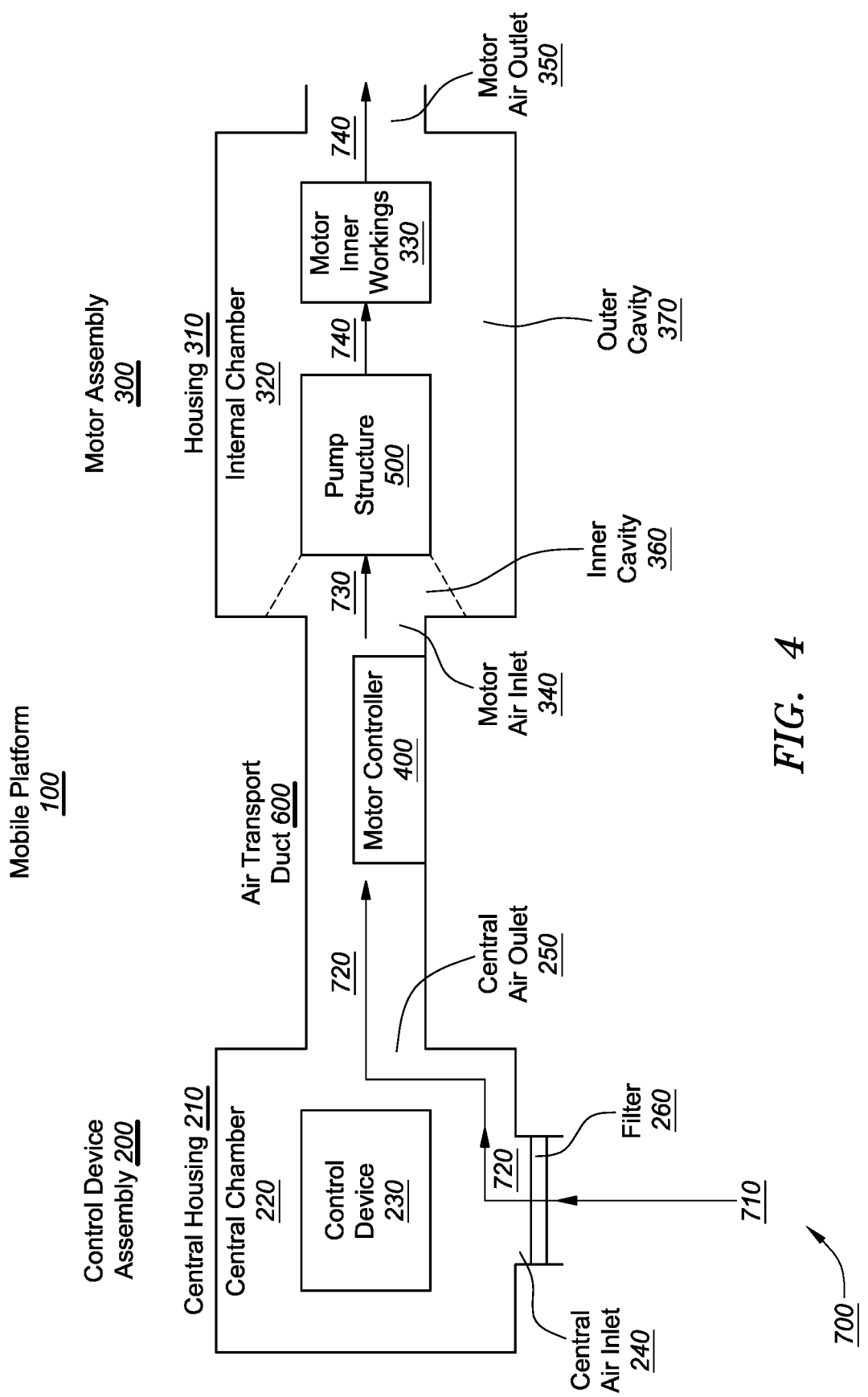
FIG. 4 is an exemplary diagram illustrating an embodiment of a mobile platform including the motor assembly of FIG. 2.

FIG. 4 is an exemplary diagram illustrating an embodiment of a mobile platform 100 including the motor assembly 300.

The mobile platform 100 may refer to any apparatus that is capable of moving over a distance. Exemplary mobile platforms can include, but are not limited to, automobiles, buses, trains, aircraft, ships, and other types of vehicles. For illustrative purposes, the mobile platform can include an Unmanned Aerial Vehicle (UAV), and an operation of the mobile platform may include a flight. However, wherever a UAV is described in the disclosed methods, devices and systems, the UAV may be replaced by another appropriate mobile platform, and a flight may be replaced by another operation associated with a mobile platform, without deviating from the concept covered in the scope of the present disclosure.

Turning to FIG. 4, the mobile platform 100 is shown as including a control device assembly 200. The control device assembly 200 can include a central housing 210. The central housing 210 can define a central chamber 220, i.e., a cavity within the central housing 210. The central chamber 220 can be defined by the central housing 210 in any conventional manner. For example, the central housing 210 can enclose any side of the central chamber 220. The central housing 210 can define the central chamber 220 with any suitable shape, size and/or dimension.

The control device assembly 200 can further include a control device 230 located within the central chamber 220. The motor assembly 300 can be configured to enable the mobile platform 100 to move in accordance with instructions from the control device 230. The central chamber 220 can be provided with a shape, size and/or dimension for at least partially receiving the control device 230. The control device 230 can include processing hardware for performing data acquisition, data processing, and any other functions and operations described herein for controlling an operation of the mobile platform 100. Without limitation, the control device 230 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In various embodiments, the control device 230 can include a processor for performing a portion of, or all of, the disclosed functions of the control device 230. Although described as including a single processor for purposes of illustration only, the control device 230 can include any suitable number of uniform and/or different processors.

Additionally and/or alternatively, the control device 230 can include a transceiver, which can include RF circuitry or any other appropriate hardware and any appropriate software instructing the hardware for receiving and/or transmitting data. For example, the transceiver can receive operational commands from a remote controller and send the operational commands to the processor to execute. The transceiver can transmit data generated by the processor, such as location and/or travel speed of the mobile platform 100, to the remote controller. Although described as including a single transceiver for purposes of illustration only, the control device 230 can include any suitable number of uniform and/or different transceivers.

Additionally and/or alternatively, the control device 230 can include a sensor (not shown). The sensor can collect data of characteristics of the mobile platform 100 including, e.g., travel speed and/or posture of the mobile platform 100, temperature and/or atmospheric pressure at a location of the mobile platform 100. Exemplary sensors can include a location data unit, an odometer, an inertial measurement unit, an accelerometer, and the like. The sensor can send the collected data to the processor of the control device 230 for controlling the mobile platform 100 accordingly. Although described as including a single sensor for purposes of illustration only, the control device 230 can include any suitable number of uniform and/or different sensors.

Referring to FIG. 4, the mobile platform 100 can include a motor assembly 300 coupled with the control device 200. A motor assembly 300 can include the housing 310, also referred to as a motor housing 310. The housing 310 can define an internal chamber 320, i.e., a cavity within the housing 310 in the manner discussed in more detail above with reference to FIG. 1.

The motor assembly 300 can further include the motor inner workings 330 at least partially located within the internal chamber 320. The motor inner workings 330 can include inner workings of the motor assembly 300 responsible for generating motion. The inner workings can include a rotor and/or a stator.

Additionally and/or alternatively, as shown in FIG. 4, the mobile platform 100 can further include a motor controller 400. The motor controller 400 can receive a control signal from the control device 230, convert the control signal into electrical power supply parameters including, e.g., voltage and/or current, and outputs power corresponding to the power supply parameters for powering and controlling the motor assembly 300. The motor controller 400 can be connected to the controlled device 230 via a wire or wirelessly. The motor controller 400 can be connected to the motor assembly 300 via a wire or wirelessly.

Although FIG. 4 illustrates the motor controller 400 as separated from the control device 230 and the motor assembly 300, the motor controller 400 can be at least partially integrated with the control device 230 and/or the motor assembly 300. That is, the control device 230 can include the motor controller 400 as a portion of the control device 230. Alternatively, the motor assembly 300 can be at least partially integrated with the motor controller 400.

Although FIG. 4 illustrates the motor controller 400 as located outside the central chamber 220 and the internal chamber 320, the motor controller 400 can be located at least partially inside the central chamber 220, the internal chamber 320, and/or at any location, without limitation.

The control device assembly 200 can further include a pump structure 500. The pump structure 500 can be referred to as a pump assembly. The pump structure 500 can be located inside the housing 310. The pump structure 500 can directionally create an air flow, transfer air and dissipate heat in the central chamber 220 and the internal chamber 320.

Although FIG. 4 illustrates the pump structure 500 as separate from the motor inner workings 330, the pump structure 500 can be at least partially integrated with the motor inner workings 330, and is not necessarily configured to be separable from the motor inner workings 330.

The central chamber 220 can communicate with a central air inlet 240 and a central air outlet 250. Both of the central air inlet 240 and the central air outlet 250 can be formed in the central housing 210. Stated somewhat differently, the central chamber 220 can form a channel between the central air inlet 240 and the central air outlet 250, such that air entering the central chamber 220 via the central air inlet 240 can traverse the central chamber 220 and exit via the central air outlet 250.

As previously described in FIGS. 1-2, the internal chamber 320 can communicate with the air inlet 340 and the air outlet 350. Both of the air inlet 340 and the air outlet 350 can be formed in the housing 310.

The central chamber 220 can communicate with the internal chamber 320 via an air transport duct 600. The air transport duct 600 can communicate with the central air outlet 250 in the central housing 210 and the air inlet 340 in the housing 310. Stated somewhat differently, the air transport duct 600 can form a channel between the central air outlet 250 and the air inlet 340, such that air entering the air transport duct 600 via the central air outlet 250 can traverse the air transport duct 600, and leave the air transport duct 600 via the air inlet 340.

In various embodiments, the air transport duct 600 can form an air-tight seal with the central housing 210 and/or the housing 310. The mobile platform 100 thereby can include an air sealed assembly enclosed in the central housing 210, the housing 310, and the air transport duct 600. Within the mobile platform 100, air can traverse from the central air inlet 240 to the air outlet 350 or from the air outlet 350 to the central air inlet 240, without an additional/alternative passage for transferring the air.

In various embodiments, the pump structure 500 as shown in FIG. 4 can generate an air flow from the central chamber 220 to the internal chamber 320. The pump structure 500 can generate the air flow by creating a pressure difference in the mobile platform 100. For example, as shown in FIG. 4, the pump structure 500 can pump air from an inner cavity 360 of the internal chamber 320 to an outer cavity 370 of the internal chamber 320. Air pressure in the inner cavity 360 thereby can be reduced and thus generate an air flow to normalize the air pressure within the inner cavity 360. Normalizing the air pressure within the inner cavity 360 can include restoring the air pressure to be equal to an air pressure outside the inner cavity 360, such as to be equal to an air pressure outside the mobile platform 100.

Environmental air 710 can enter the mobile platform 100 via the central air inlet 240. The environmental air 710 can include air located outside the mobile platform 100. The environmental air 710 can enter the central chamber 220 via the central air inlet 240. The central chamber 220 can transform the environmental air 710 to central air 720.

Transforming the environmental air 710 to the central air 720 can include changing the location of the environmental air 710 from outside the mobile platform 100 to inside the central chamber 220. Further, during an operation of the mobile platform 100, the control device 230 can generate heat. Thus, the temperature of the central air 720 can be greater than the temperature of the environmental air 710.

The central air 720 can exit the central chamber 220 via the central air outlet 250. The central air 720 can then flow through the air transport duct 600 and enter the internal chamber 320 via the air inlet 340. The internal chamber 320 can transform the central air 720 to incoming air 730. Transforming the central air 720 to the incoming air 730 can include changing the location of the central air 720 from outside the internal chamber 320 to inside the internal chamber 320. The central air 720 thereby includes air that is exterior of the internal chamber 320.

The incoming air 730 can normalize the reduced air pressure in the inner cavity 360. Further, because the operation of the pump structure 500, the incoming air 730 can be pumped to the outer cavity 370. The pump structure 500 can transform the incoming air 730 into outgoing air 740.

Transforming the incoming air 730 to the outgoing air 740 can include changing the location of the incoming air 730 from the inner cavity 360 to the outer cavity 370. In addition, forces that the pump structure 500 applies to the incoming air 730 and the outgoing air 740, respectively, can be different. The pump structure 500 draws the incoming air 730 from the air inlet 340 into the inner cavity 360. In contrast, by pumping air from the inner cavity 360 into the outer cavity 370, the pump structure 500 pressures and expels the outgoing air 740 to exit the outer cavity 370 and exit the internal chamber 320 via the air outlet 350.

Further, during operation of the motor assembly 300, the motor inner workings 330 can generate heat. When air traverses from the air inlet 340 to the air outlet 350, the air can be heated by the motor inner workings 330 and thus cools the motor inner workings 330.

FIG. 4 illustrates the motor inner workings 330 as being located in the outer cavity 370. A temperature of the outgoing air 740 can be greater than the temperature of the incoming air 730. A temperature of the incoming air 730 can be similar to or the same as a temperature of the central air 720. The motor inner workings 330 shown in FIG. 4 is for illustrative purposes only and does not necessarily include the entire the motor inner workings 330. The motor inner workings 330 in FIG. 4 can include a portion of the motor inner workings 330 that can generate heat during an operation of the motor assembly 300.

Although FIG. 4 illustrates the motor inner workings 330 as being located in the outer cavity 370, in certain embodiments, the portion of the motor inner workings 330 that generates heat can be located in the inner cavity 360, without limitation. In that case, a temperature of the incoming air 730 can be greater than a temperature of the central air 720. A temperature of the outgoing air 740 can be similar to or the same as a temperature of the incoming air 730.

Thus, when air traverses from the air inlet 340 to the air outlet 350, the air can reduce the temperature of the motor inner workings 330. The environmental air 710, the central air 720, the incoming air 730, and the outgoing air 740 can form an air flow 700 flowing through the mobile platform 100.

Optionally, as shown in FIG. 4, the central air inlet 240 can be covered by a filter 260 for filtering the environmental air 710 before the environmental air 710 enters the central chamber 220 via the central air inlet 240. Thus, the central air 720 can be cleaned to remove undesired contaminants. Accordingly, the incoming air 730 and the outgoing air 740 each can be both clean. The filter 260 can thus prevent contamination of the control device 230 and the motor assembly 300, extending a lifetime of the mobile platform 100.

During an operation of the mobile platform 100, the control device 230 and the motor assembly 300 can generate a great amount of heat and have increased temperature. Generally, the motor assembly 300 can have a higher temperature than the control device 230. If the motor assembly 300 is in an enclosed housing where the heat cannot be dissipated sufficiently, the lifetime of the motor assembly 300 can be significantly reduced, and operation of the mobile platform 100 can become unsafe.

Certain conventional mobile platforms, such as UAVs, place a motor in a housing that has an open structure. That is, heat dissipation holes are opened on the housing for exchanging air between the interior of the housing and the air outside the housing. In addition, an electric fan is installed to increase air flow in the motor, in order to pressure air toward the motor and cool the motor. However, for certain applications, a UAV needs to be exposed to a harsh environment including, e.g., corrosive (for example, for operations including spraying a pesticide), dusty and/or humid air. In those cases, air sealing the electronic components (e.g., control device and motor) of the UAV can be desirable. The heat dissipation of an air sealed UAV can be significantly limited. Even with the electric fan, heat dissipation is insufficient because the motor does not exchange air with external environment and thus only heated air is circulated within a housing enclosing the motor.

According to the method 2000 of FIG. 3 and the motor assembly 300 in FIG. 4, the pump structure 500 can directly draw the incoming air 730 into the internal chamber 320 to cool the motor inner workings 330. The incoming air 730 can be drawn from the environmental air 710 in the environment outside the mobile platform 100. The incoming air 730 and the outgoing air 740 can form an air flow that brings in air with a temperature that is cooler than a temperature of the motor inner workings 330 to cool the motor inner workings 330. The airflow then exits the internal chamber 320.

Further, the environmental air 710 can first enter the central chamber 220 and transform into the central air 720 to cool the control device 230. After being heated by the control device, the central air 720 can still be cooler than the motor inner workings 330. The incoming air 730 can be drawn from the central air 720 via the air transport duct 600 to cool the motor inner workings 330. The air flow 700 can thus cool both of the control device 230 and the motor inner workings 330. The motor assembly 300 can thus have desired heat dissipation and strong resistance to dust, moist, and corrosion.

Although FIG. 4 shows the pump structure 500 as being located within the internal chamber 320 for purposes of illustration only, the pump structure 500 can be located at any suitable location, including outside the internal chamber 320. Further, although described as including a single pump structure 500 for purposes of illustration only, the mobile platform 100 can include any suitable number of uniform and/or different pump structures 500. Each pump structure 500 can be located at a respective location. For example, the pump structure 500 can be located outside the internal chamber 320 and adjacent to the air inlet 340, inside the internal chamber 320, and/or outside the internal chamber 320 and adjacent the air outlet 350, without limitation.

Figure 5:
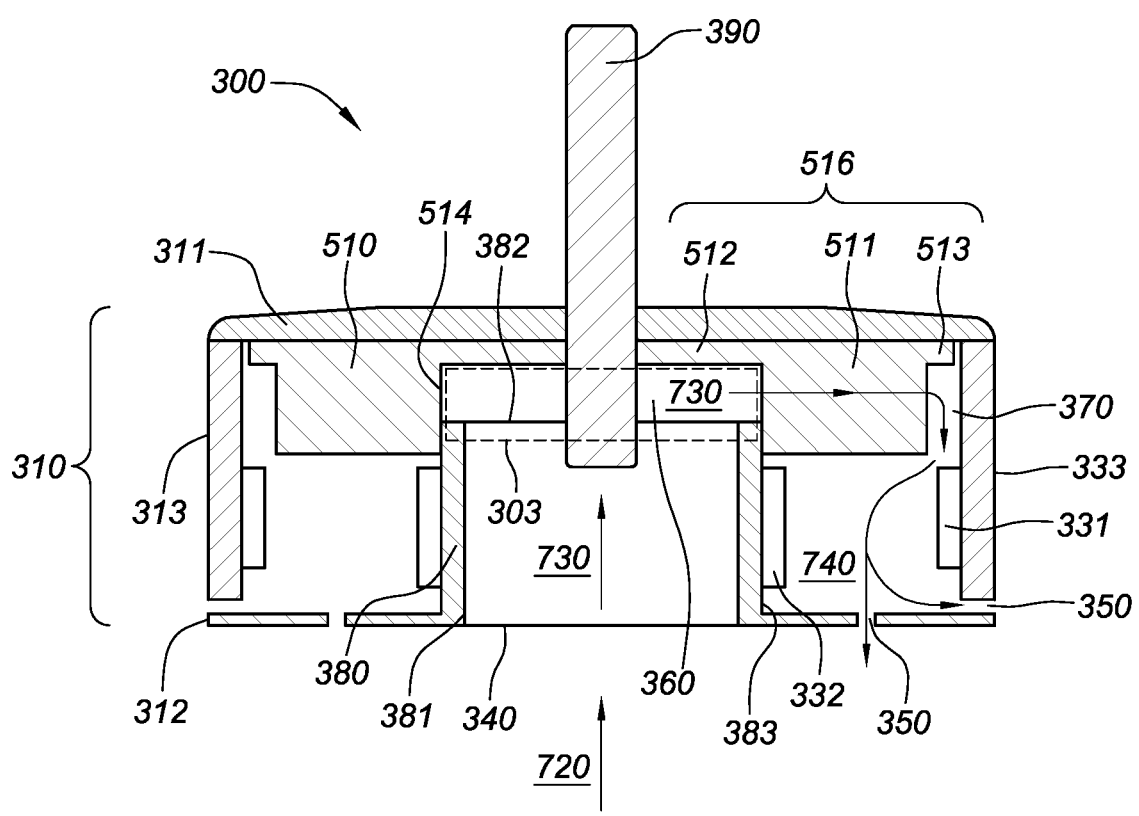
FIG. 5 is an exemplary diagram illustrating an embodiment of the motor assembly of FIG. 2, wherein a cross-sectional view of the motor assembly is shown.

Various exemplary alternative embodiments are provided as follows, to further illustrate the method 2000 and the motor assembly 300. FIG. 5 is an exemplary diagram illustrating an embodiment of the motor assembly 300, wherein a cross-sectional view of the motor assembly 300 is shown.

In FIG. 5, the motor assembly 300 can include the housing 310. The housing 310 can include a first cover 311, a second cover 312 and a sidewall 313. The sidewall 313 can encircle the internal chamber 320 and join the first cover 311 and the second cover 312. The first cover 311 and the second cover 312 can have any shape, without limitation. For example, as illustrated in FIGS. 6-10, the internal chamber 320 can have a cylindrical shape. The first cover 311 and the second cover 312 can form the two opposing bases of the cylinder. The first cover 311 and the second cover 312 can each have a circular shape. The sidewall 313 can thus form the side surface of the cylinder that is perpendicular to the first cover 311 and the second cover 312.

The motor assembly 300 can include a rotor 331 and a stator 332. The rotor 331 can include a magnet. The stator 332 can include a coil and can generally heat to an elevated temperature during operation of the motor assembly 300. When a current flows in the coil, the current and/or change in the current can generate a magnetic field that drives the rotor 331 to rotate with respect to a certain axis.

In FIG. 5, the motor assembly 300 further includes a magnetic yoke 333. The magnetic yoke 333 can have slots on an inner surface facing the internal chamber 320, for installing the rotor 331. The magnetic yoke 333 can function as the sidewall 313 at the same time. Therefore, in FIG. 5, the housing 310 includes a portion of the motor inner workings 330.

The motor assembly 300 can include a duct 380. The duct 380 can have a pipe-shaped structure. The duct 380 can have two openings formed on opposite ends of the pipe-shaped structure. The two openings can include a first opening 381 communicating with the air inlet 340, and a second opening 382 that opens toward the internal chamber 320, i.e., the interior of the internal chamber 320. The incoming air 730 can enter the internal chamber 320 via the duct 380.

The motor assembly 300 further includes a central motor shaft 390 defining an axis of rotation of the rotor 331. The central motor shaft 390 can pass through a center of the first cover 311 and protrude outside the housing 310. Propellers (not shown) can be installed on the protruding portion of the central motor shaft 390 to be driven by the motor inner workings 330. The motor assembly 300 can thus provide a propulsion force for moving the mobile platform 100.

In FIG. 5, the pump structure 500 can include one or more blades 516. The blade 516 can be installed on an inner wall of the first cover 311. The blade 516 can include a planar structure with a wide portion 511 and two narrow portions radially separated by the wide portion 511. The two narrow portions can include a first narrow portion 512 extending from the central motor shaft 390 to the wide portion 511, and a second narrow portion 513 radially separated from the first narrow portion 512 by the wide portion 511.

The blade 516 can extend from the central motor shaft 390 radially toward the sidewall 313 but does not necessarily need to contact the central motor shaft 390. The central motor shaft 390 can drive rotation of the first cover 311 to rotate the blade 516 with respect to the central motor shaft 390.

In one embodiment, the blade 516 can be an integral part of the first cover 311. That is, the blade 516 and the first cover 311 can be made of the same material and in one molding process. In another embodiment, the blade 516 can be separate from, and mounted on, the first cover 311.

During an operation of the motor assembly 300, the rotor 331 can rotate with respect to the central motor shaft 390. The magnetic yoke 333 can rotate with the rotor 331. The first cover 311 can be fixed with the magnetic yoke 333 and thus can also rotate with the rotor 331. The central motor shaft 390 can be fixed relative to the first cover 311 and thus be driven to rotate with the rotor 331. The blade 516 can rotate with the first cover 311. Thus, the magnetic yoke 333, the rotor 331, the first cover 311, the central motor shaft 390, and the blade 516 each can rotate synchronously and coaxially.

In various embodiments, the pump structure 500 can include a plurality of blades 516. The blades 516 can form a radial pattern centered at the central motor shaft 390. Further, an edge of the wide portion 511 facing the central motor shaft 390, i.e., the shaft-ward edge 514 of the wide portion 511, can be infinitely close to an outer surface 383 of the duct 380. That is, the shaft-ward edge 514 can nearly touch, but does not touch the outer surface 383. In a non-limiting example, a gap between the shaft-ward edge 514 and the outer surface 383 can be greater than 0 mm and range from 0 mm to 0.2 mm. Thus, when the duct 380 is stationary during the operation of the motor assembly 300, the duct 380 does not affect the rotation of the blades 516.

The cylindrical volume of space 303 (indicated by dashed line) encircled by the shaft-ward edges 514 of the blades 516 can function as an extension of the duct 380. Thus, the cylindrical volume of space 303 encircled by the shaft-ward edges 514 of the blades 516, in combination with the duct 380, can form the inner cavity 360 of the internal chamber 320. The incoming air 730 can enter the inner cavity 360 upon entering the internal chamber 320.

The blade 516 can be vertical to the first cover 311. In other words, the planer structure of the blade can face a direction vertical to the central motor shaft 390. The blade(s) 516 can form a centrifugal fan. When the blades rotate, centrifugal force (i.e., a lack of centripetal force) of the air in the inner cavity 360 can pump the air and cause the air to escape radially away from the inner cavity 360, i.e., in a direction away from the central motor shaft 390, via a gap between neighbouring blades 516. The air pressure in the inner cavity 360 can thus be reduced. Incoming air 730 can thus be drawn into the inner cavity 360 to normalize the air pressure.

The space in the internal chamber 320 that is not in the inner cavity 360 can be the outer cavity 370. Therefore, as shown in FIG. 5, the outer cavity 370 can surround the inner cavity 360. The outer cavity 370 and/or the inner cavity 360 can surround the central motor shaft 390. The outer cavity 370 and/or the inner cavity 360 can be centered at the central motor shaft 390. In certain embodiments, the outer cavity 370 and/or the inner cavity 360 can be arranged concentrically with respect to the central motor shaft 390.

Air escaped radially from the inner cavity 360 can enter the portion of the outer cavity 370 adjacent to the second narrow portion 513 of the blade 516 and travel toward the air outlet 350. The incoming air 730 pumped into the outer cavity 370 is referred to as the outgoing air 740. The outgoing air 740 can be expelled, or pressured, out of the internal chamber 320 via the air outlet 350 by the centrifugal fan. On the way toward the air outlet 350, the outgoing air 740 can cool the stator 332 prior to exiting the internal chamber 320.

Figure 6:
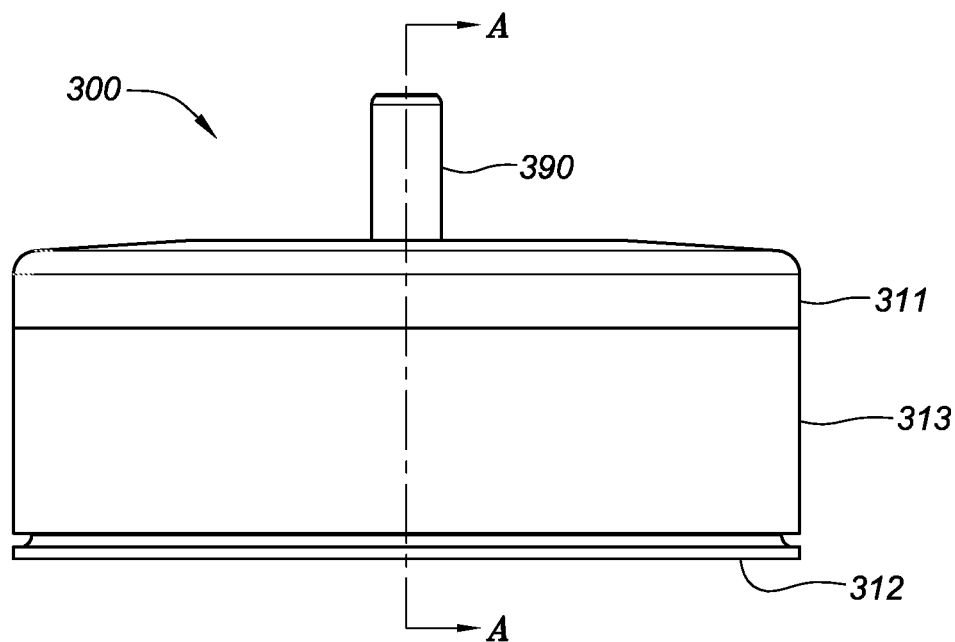
FIGS. 6-10 are detail drawings of an alternative embodiment of the motor assembly of FIG. 2, wherein the motor assembly includes a central motor shaft.

FIG. 6 is a detail drawing of an alternative embodiment of the motor assembly of FIG. 2, wherein a side view of the motor assembly 300 is shown. FIG. 6 illustrates the central motor shaft 390 as protruding beyond an outer surface of the first cover 311. The sidewall 313 can join the first cover 311 and the second cover 312 together to form the housing 310.

Figure 7:
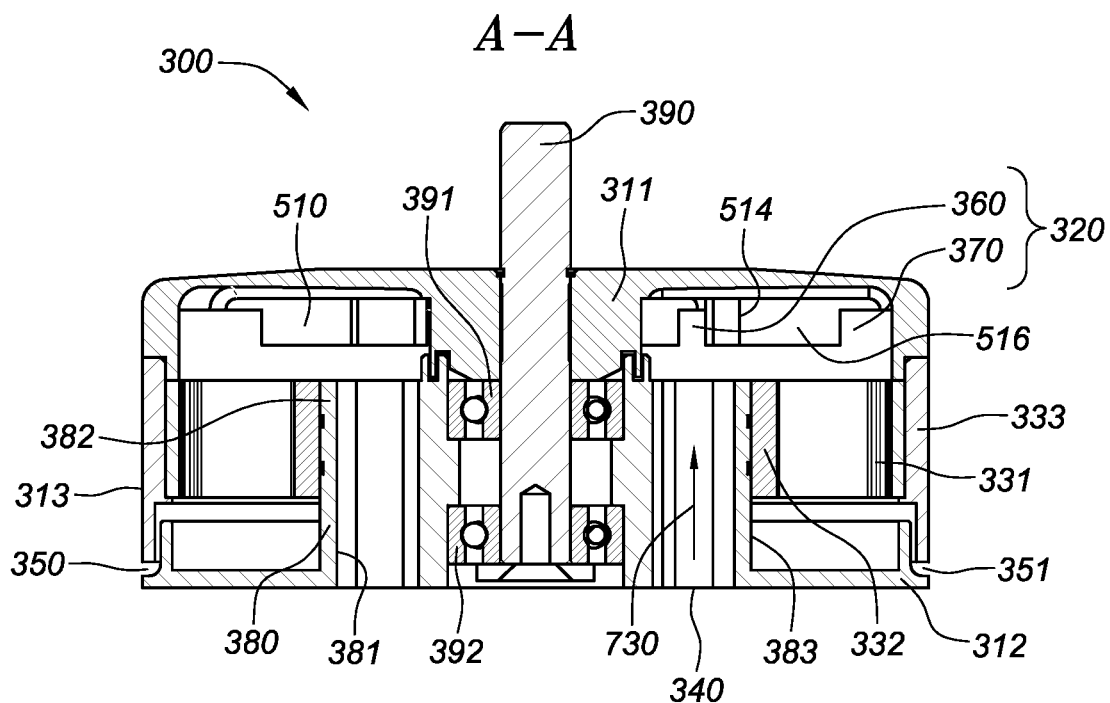

FIG. 7 is a detail drawing of an alternative embodiment of the motor assembly of FIG. 6, wherein a cross-sectional view of the motor assembly along an A-A plane of FIG. 6 is shown. In FIG. 7, the housing 310 includes the first cover 311, the second cover 312 and the magnetic yoke 333. The magnetic yoke 333 encircles the internal chamber 320 and joins the first cover 311 and the second cover 312.

The rotor 331 can include one or more magnets installed on the inner surface of the magnetic yoke 333, and surrounding the stator 332. The stator 332 can include one or more coils. Each coil can wind relative to a coil axis. The coil axis can be oriented in a radial direction from the central motor shaft 390 toward the magnetic yoke 333.

The motor assembly 300 further includes the duct 380. The duct 380 can include the first opening 381 communicating with the air inlet 340, and the second opening 382 that opens toward the internal chamber 320. The incoming air 730 can enter the internal chamber 320 via the duct 380.

In FIG. 7, the pump structure 500 can include the blade 516. The blade 516 can be installed on the inner wall of the first cover 311. The blade 516 can include the planar structure including the wide portion 511, the first narrow portion 512 and the second narrow portion 513 (not shown in FIG. 7 but illustrated in FIG. 4).

During an operation of the motor assembly 300, the magnetic yoke 333, the rotor 331, the first cover 311, the central motor shaft 390, and the blade 516 can rotate synchronously and coaxially. In the embodiment shown in FIG. 7, the outer cavity 370 and the inner cavity 360 can be arranged concentrically with respect to the central motor shaft 390.

Further, one or more bearings can be used for fixing the central motor shaft 390 to another portion of the motor assembly 300, e.g., the first cover 311. In FIG. 7, a first bearing 391 can be used for fixing the central motor shaft 390 to the first cover 311. A second bearing 392 can be used for fixing the central motor shaft 390 to other components (not shown) adjacent to the second cover 312 as needed.

Figure 11:
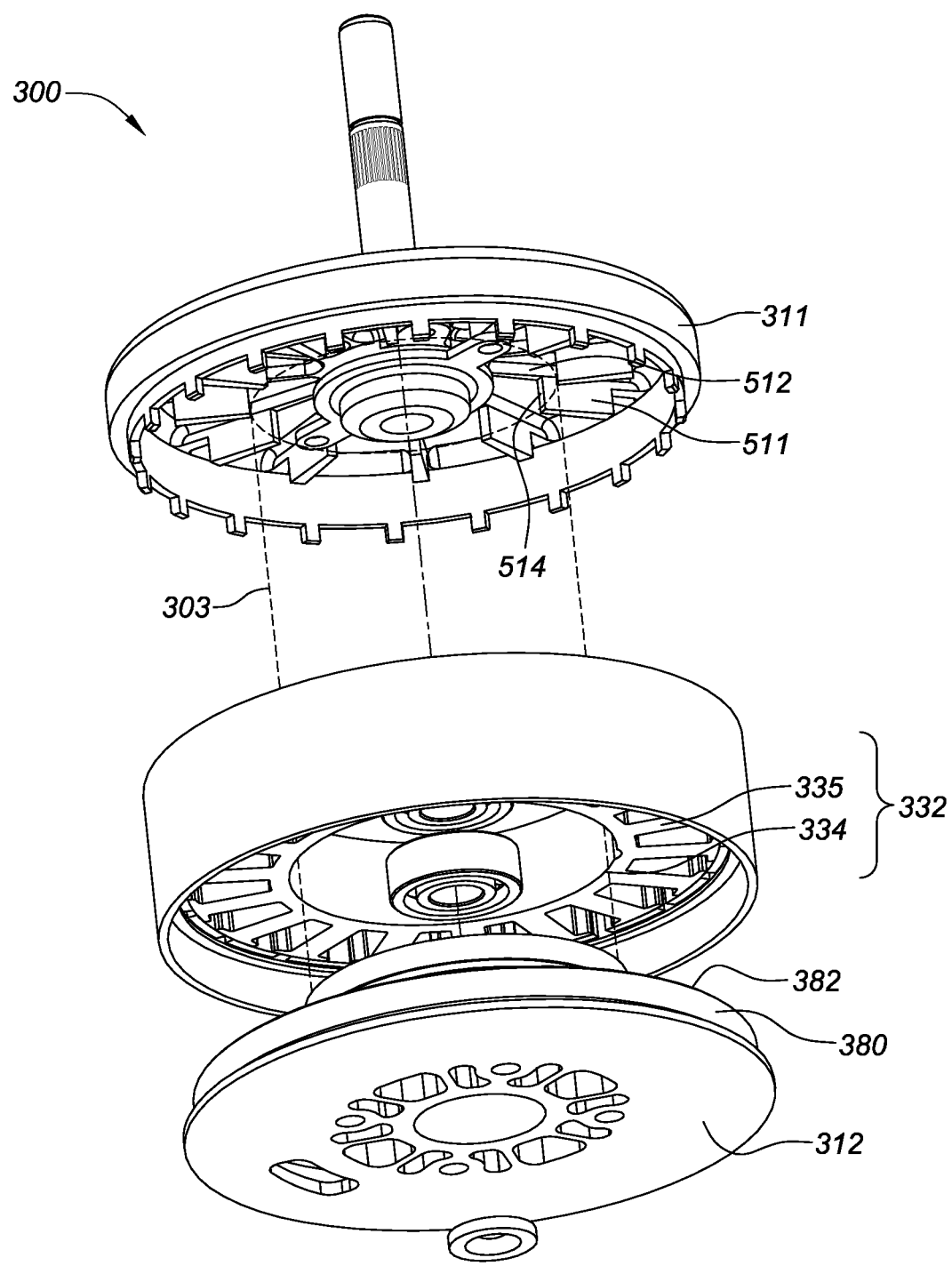
FIGS. 11-14 are detail drawings of another alternative embodiment of the motor assembly of FIG. 2, wherein an exploded view of the motor assembly is shown from selected respective perspectives.

As shown in FIG. 7, the pump structure 500 can include a plurality of blades 516. Further, as shown in FIGS. 5 and 11 though not shown in FIG. 7, the shaft-ward edge 514 of the wide portion 511 can be infinitely close to an outer surface 383 of the duct 380. Thus, the duct 380 can fit within the space defined by the shaft-ward edge 514 of the wide portion 511 and the first narrow portion 512.

As described in FIG. 5, the duct 380 and the shaft-ward edges 514 of the wide portion 511 can define a cylindrical volume of space 303 in the internal chamber 320. The cylindrical volume of space 303 and space in the duct 380 can be referred as the inner cavity 360 of the internal chamber 320. Air within the inner cavity 360 is the incoming air 730.

The blade 516 can be vertical to the first cover 311. The blade(s) 516 can form a centrifugal fan. When the blades rotate, either clockwise or counter-clockwise relative to the central motor shaft 390, the incoming air 730 can be centrifuged to the outer cavity 370 and transform into the outgoing air 740. The outgoing air 740 can be expelled out of the internal chamber 320 via the air outlet 350. The air outlet 350 can include a gap 351 between the second cover 312 and the magnetic yoke 333.

Figure 8:
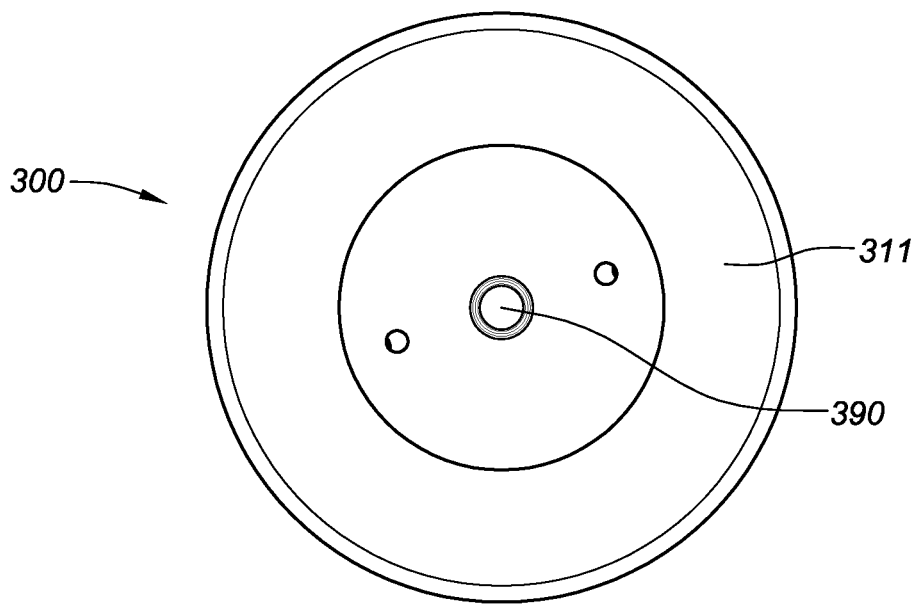
Figure 9:
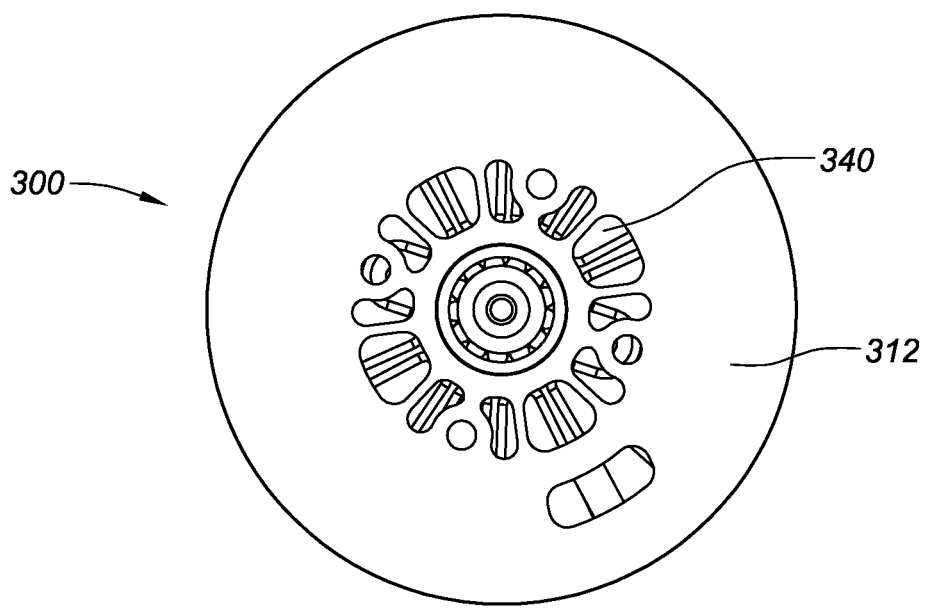

FIG. 8 is a detail drawing of another alternative embodiment of the motor assembly of FIG. 6, wherein a top view of the motor assembly is shown. FIG. 8 illustrates the first cover 311 of the motor assembly 300 having a protruding end of a central motor shaft 390. FIG. 9 is a detail drawing of another alternative embodiment of the motor assembly of FIG. 6, wherein a bottom view of the motor assembly is shown. FIG. 9 illustrates the second cover 312 of the motor assembly 300 as having the air inlet 340 formed. The air inlet 340 can include one or more holes on the second cover 312.

Figure 10:
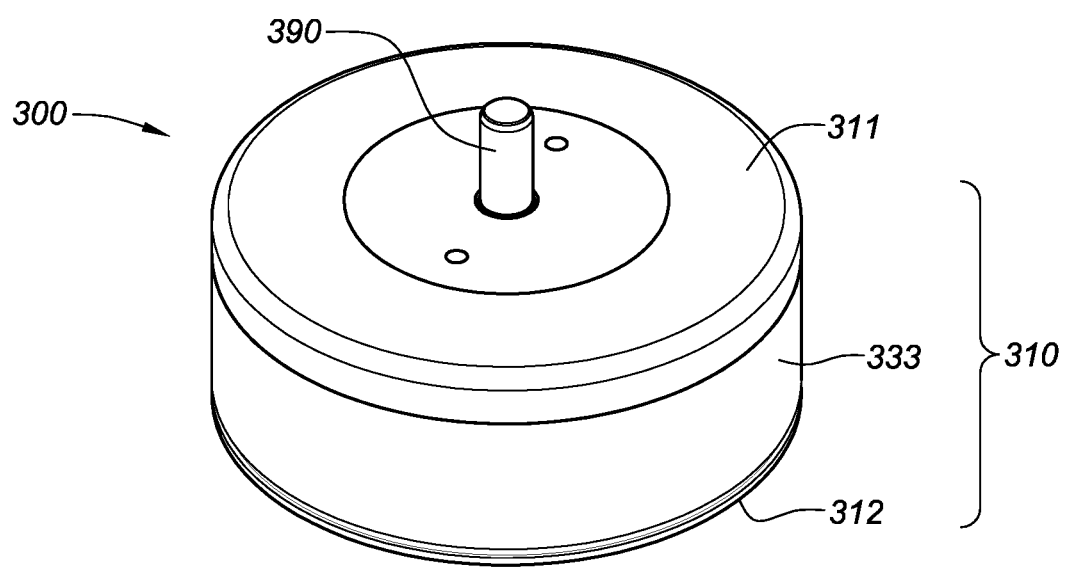

FIG. 10 is a detail drawing of another alternative embodiment of the motor assembly of FIG. 6, wherein a prospective view of the motor assembly is shown. FIG. 10 illustrates the magnetic yoke 333 and the first cover 311 as being assembled with each other. The magnetic yoke 333, the first cover 311 and the second cover 312 (as in FIG. 9) can form the housing 310.

FIG. 11 is a detail drawing of another alternative embodiment of the motor assembly of FIG. 2, wherein an exploded view of the motor assembly is shown. FIG. 11 illustrates the first cover 311 on the right and the second cover 312 on the left. The stator 332 illustrated in FIG. 11 includes a center ring 334 having a plurality of teeth 335 radially extended from the ring 334. In a non-limiting example, a coil (not shown) can be wound on tooth 335 and enabled to receive electric current signal from a motor controller 400 (as in FIG. 4).

The cylindrical volume of space 303 (indicated by dashed line) defined by the shaft-ward edges 514 of the blades 516 can function as an extension of the duct 380. Thus, the cylindrical volume of space encircled by the shaft-ward edges 514 of the blades 516, in combination with the duct 380, can form the inner cavity 360 of the internal chamber 320. The incoming air 730 can enter the inner cavity 360 upon entering the internal chamber 320.

The second opening 382 of the duct 380 can fit within the cylindrical space indicated by the dashed line 303. In certain embodiments, the edge of the second opening 382 of the duct 380 can fit in the corner between the wide portion 511 and the first narrow portion 512.

Figure 12:
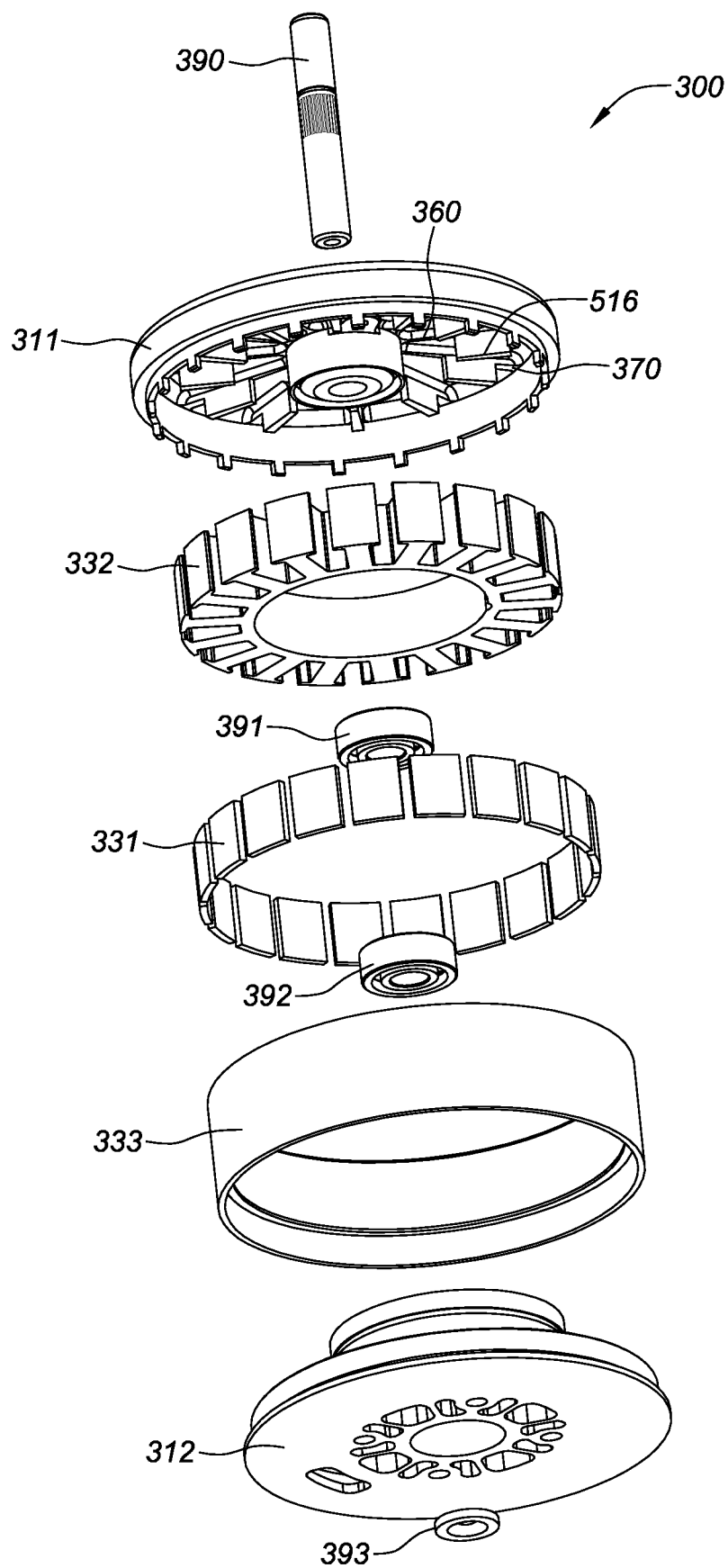

FIG. 12 is a detail drawing of another alternative embodiment of the motor assembly of FIG. 2, wherein an exploded view of the motor assembly is shown. FIG. 12 illustrates the exploded view in FIG. 11 in greater detail. For example, FIG. 12 further illustrates an axis disk 393 for covering the bearing 392 adjacent to the second cover 312.

Figure 13:
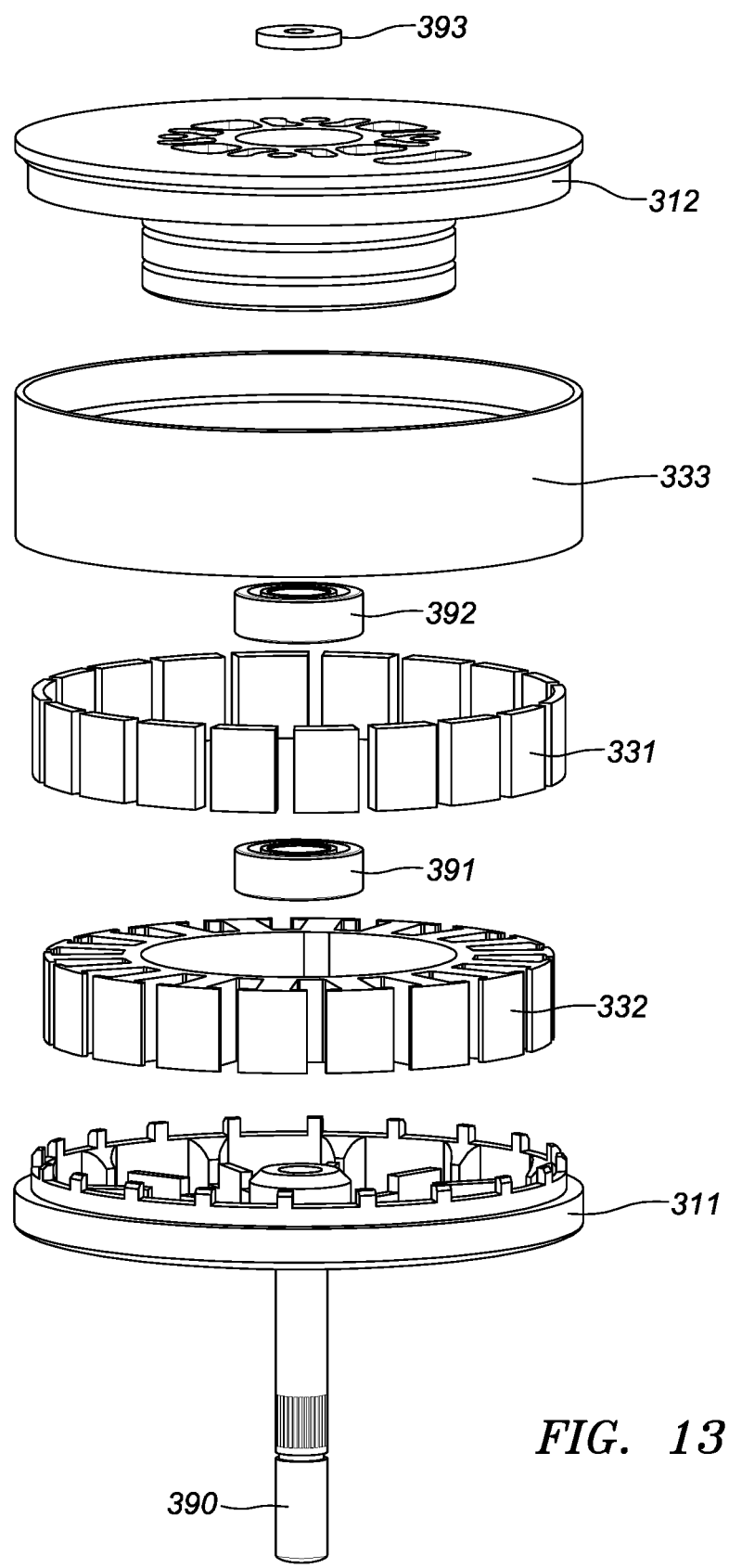
Figure 14:
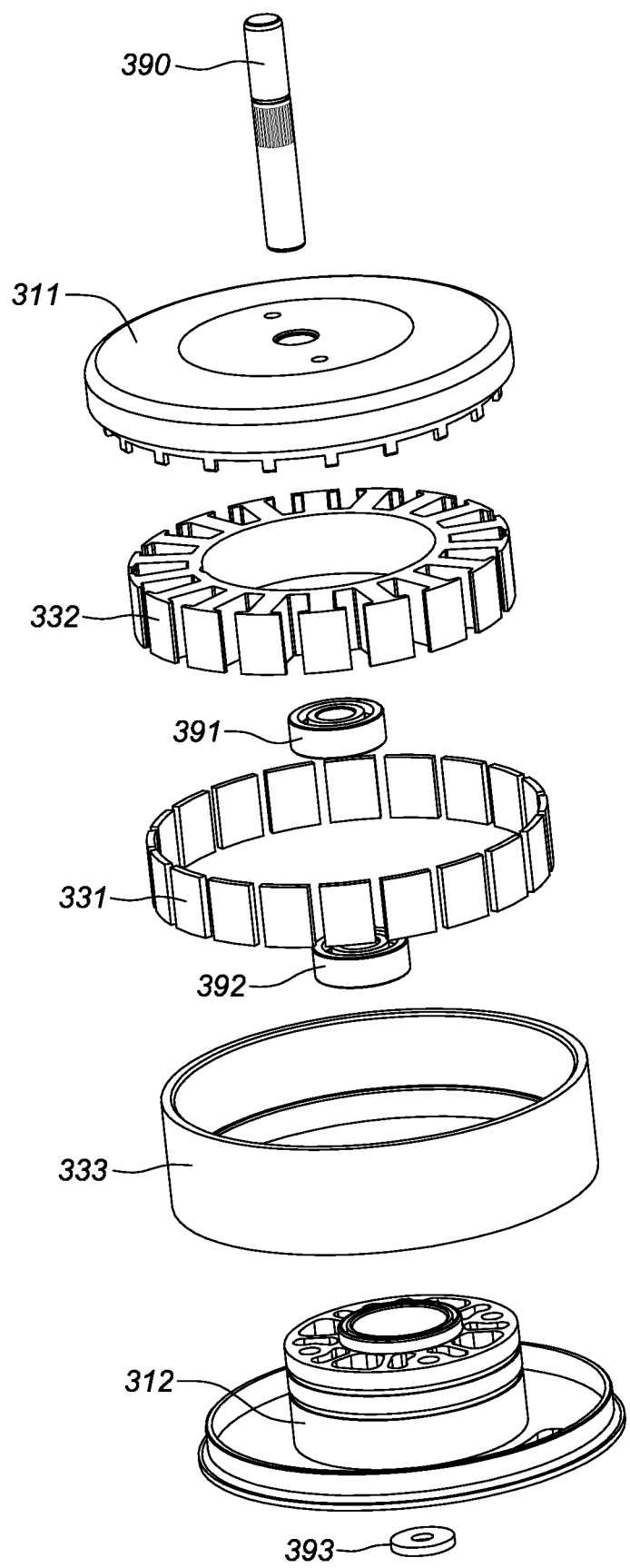

FIG. 13 is a detail drawing of another alternative embodiment of the motor assembly of FIG. 2, wherein an exploded view of the motor assembly is shown from a perspective different from the perspective of FIG. 12. FIG. 13 illustrates the first cover 311 on the left and the second cover 312 on the right. FIG. 14 is a detail drawing of another alternative embodiment of the motor assembly of FIG. 2, wherein an exploded view of the motor assembly is shown from a perspective different from the perspective of FIG. 13. FIG. 14 illustrates the exploded view in FIG. 13 in greater detail.

Figure 15:
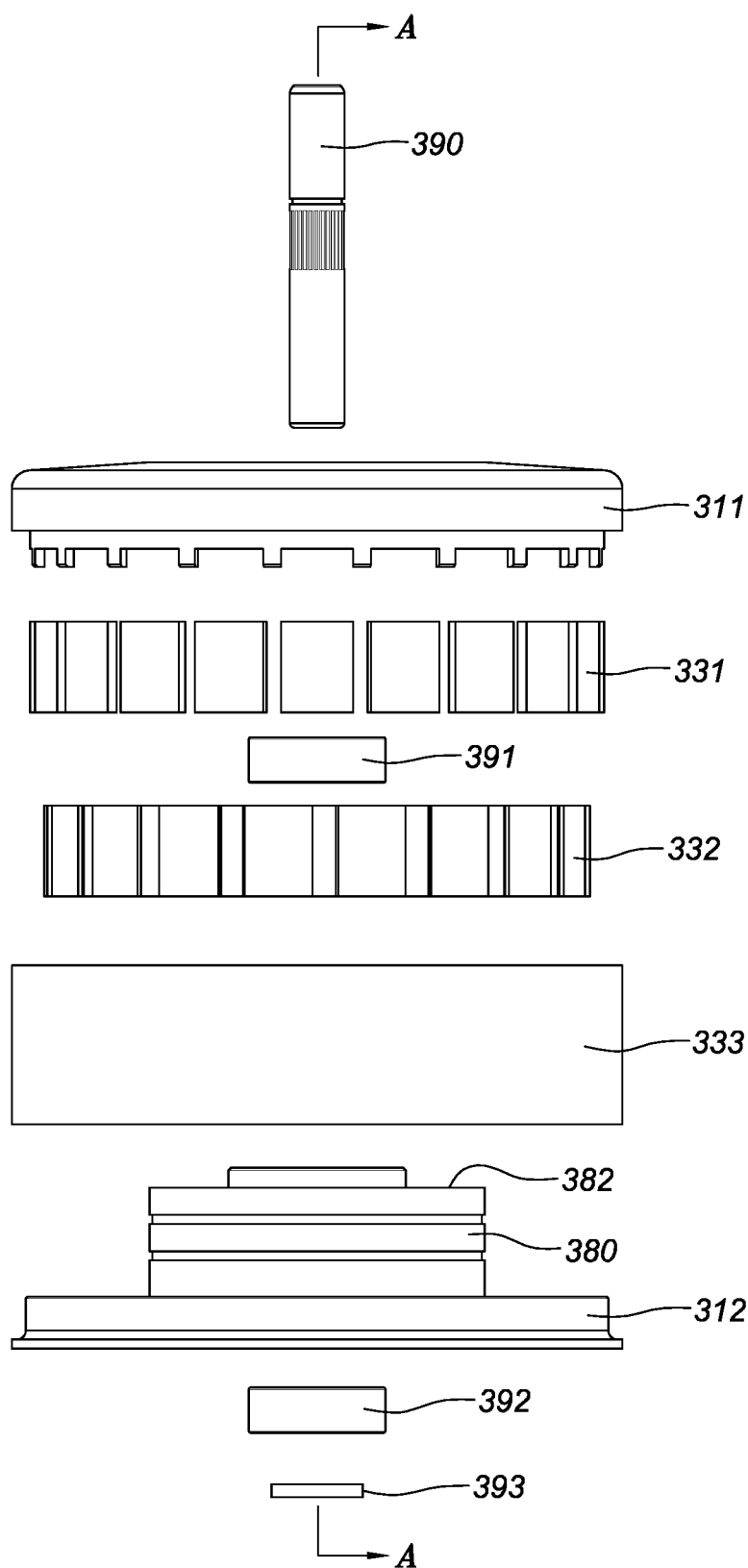
FIG. 15 is a detail drawing of another alternative embodiment of the motor assembly of FIG. 2, wherein an exploded side view of the motor assembly is shown, and a rotor is arranged to surround the stator once assembled in the motor assembly.
Figure 16:
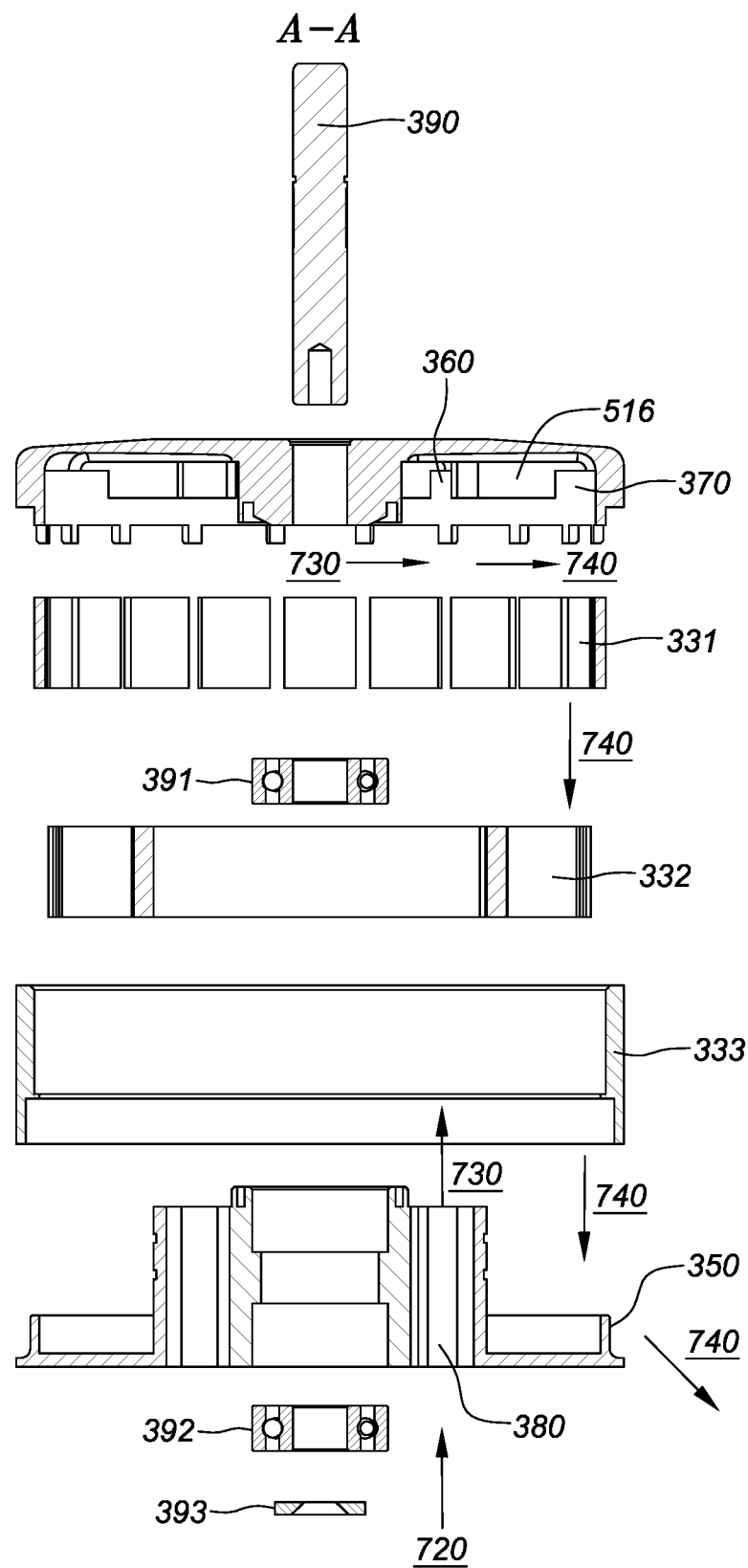
FIG. 16 is a detail drawing of an alternative embodiment of the motor assembly of FIG. 15, wherein an exploded cross-sectional view of the motor assembly along an A-A plane of FIG. 15 is shown.

FIG. 15 is a detail drawing of another alternative embodiment of the motor assembly of FIG. 2, wherein an exploded side view of the motor assembly is shown. FIG. 16 is a detail drawing of an alternative embodiment of the motor assembly of FIG. 15, wherein an exploded cross-sectional view of the motor assembly along an A-A plane of FIG. 15 is shown.

FIG. 16 illustrates the duct 380 as being integrated with the second cover 312. That is, the duct 380 and the second cover 312 can be one physical piece. The central air 720 can enter the duct 380 and become the incoming air 730. The incoming air 730 in the inner cavity 360 can be centrifuged by the blade 516 during rotation of the blade 516, and enter the outer cavity 370 to become the outgoing air 740. The outgoing air 740 can thus be pressured by the rotating blade 516 and exit the motor assembly 300 via the air outlet 350.

Therefore, as shown in FIGS. 3-16, the motor assembly 300 can be equipped with a centrifugal fan. The motor assembly 300 can include the blades 516 enabled to rotate with respect to the central motor shaft 390 synchronously and coaxially with the rotor 331. Thus, once the motor assembly 300 starts to operate, the centrifugal fan can automatically and simultaneously start to operate and generate the airflow 700 (as shown in FIG. 4) to cool the motor inner workings 330. To form the centrifugal fan, the blades 516 can be added to the motor assembly 300 and no other cooling equipment needs to be installed. Thus, the motor assembly 300 can remain lightweight and does not significantly affect flight time of the UAV.

Parameters of the centrifugal fan can include, but be not limited to, rotating speed of the blade 516, and the respective size/shape of the wide portion 511, the first narrow portion 512 and the second narrow portion of the blade 516. Specific values of such parameters can be optimized accordingly to size/shape of the internal chamber 320 and requirement on heat dissipation capacity for the motor assembly 300, and are not limited in the present disclosure. Given the size of the internal chamber 320 and the size of the duct 380, the wide portion 511 having a greater size and/or a greater rotating speed can apply a greater pressure to centrifuge the incoming air 730 and expel the outgoing air 740, and thus having a stronger cooling effect for the motor assembly 300. An inner cavity 360 having a greater size can result in greater effect for drawing the incoming air 730.

In various embodiments, the second opening 382 of the duct 380 and the blade 516 need to form a mutual geometrical fit without being in contact with each other, such that the rotating blades 516, in combination with the duct 380, can enclose the inner cavity 360 without significant air leakage between the blade 516 and the duct 380. That is, a cylinder encircled by the shaft-ward edges 514 of the wide portion 511 of multiple blades 516 can form an extension of the cylindrical duct 380.

In certain embodiments, the duct 380 can fit into the space encircled by the wide portions 511 of multiple blades 516, without contacting the wide portions 511. The distance from the center of the central motor shaft 390 to the shaft-ward edges 514 can be substantially equal to the outer diameter of the duct 380, but the duct 380 and blade 516 do not necessary contact each other.

When the blades 516 rotate, the shaft-ward edges 514 and the first narrow portion 512 can effectively enclose the inner cavity 360. Thus, the centrifugal fan can reduce the air pressure in the inner cavity 360 to produce a vacuum. Insufficient enclosure of the inner cavity 360 can cause excessive leaking of the outgoing air 740 back into the inner cavity 360 and thus weaken the effect of the vacuum. However, complete sealing between the inner cavity 360 and outer cavity 370 is not necessary, because the incoming air 730 in the inner cavity 360 may need to escape to the outer cavity 370. In certain embodiments, the incoming air 730 in the inner cavity 360 can escape to the outer cavity 370 via the gap between neighboring blades 516, to become the outgoing air 740.

In certain embodiments, the shape of the blade 516 can be other than rectangular in order to achieve the geometric fit with the duct 380. Additional features can also be included in the motor assembly to enhance the cooling effect. For example, FIG. 17 is a detail drawing of another alternative embodiment of the motor assembly of FIG. 2, wherein an exploded view of the motor assembly is shown.

Figure 17:
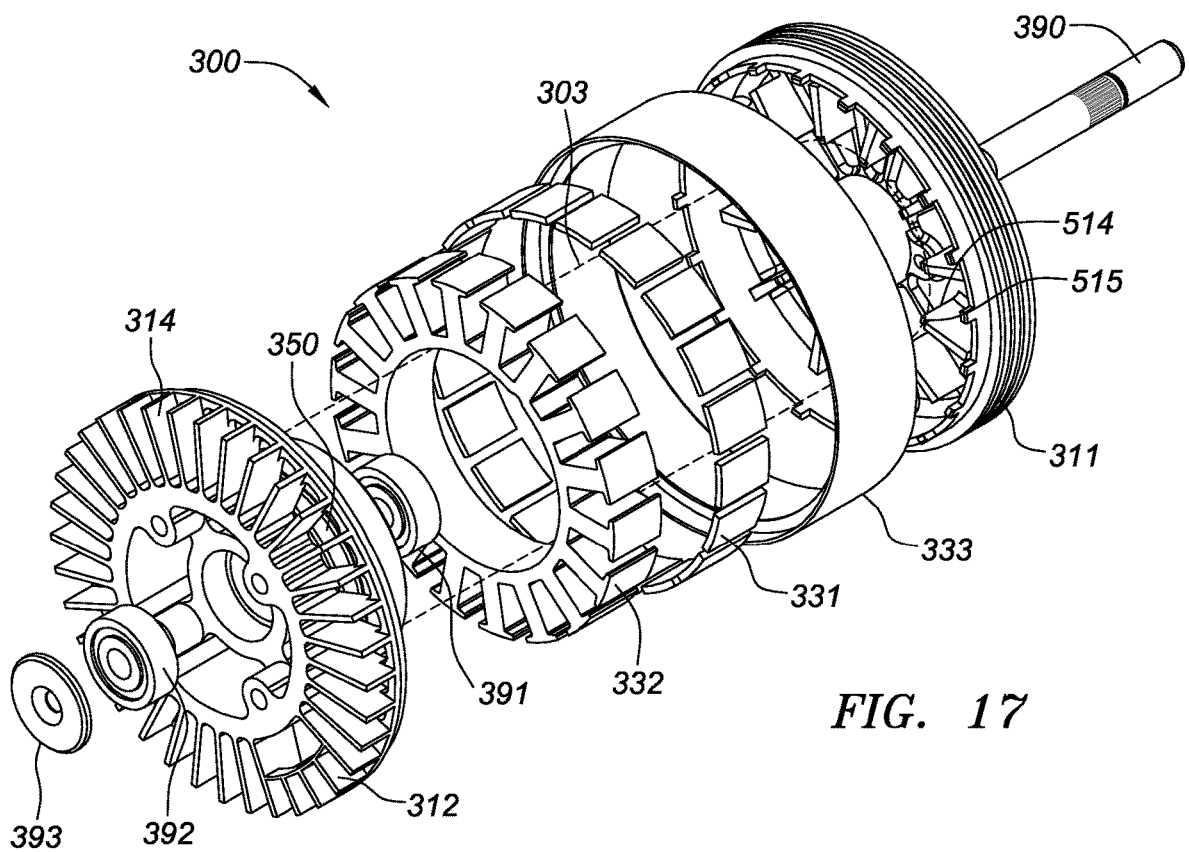
FIGS. 17-23 are detail drawings of another alternative embodiment of the motor assembly of FIG. 2, wherein the motor assembly includes a heat dissipation fin.

FIG. 17 depicts the wide portion 511 as having a notch 515 at the shaft-ward edge 514 adjacent to the duct 380. When the motor assembly 300 is assembled, the duct 380 can fit in the notch 515 to achieve a seal during the rotation of the blade 516, without contacting the blade 516. In other words, the notch 515 can have a shaft-ward edge facing the central motor shaft 390 (farther from the central motor shaft 390 than the shaft-ward edge 514), and the duct 380 can fit into the space defined by such a shaft-ward edge, without contacting the blade 316. Therefore, the cylindrical volume of space 303 can be defined by the shaft-ward edges 514 of the blades 516. The notch 515 can have an angle matching the edge profile of duct 380, and does not necessary touch the duct 380.

Further, FIG. 17 depicts a plurality of heat dissipation fins 314 on the second cover 312 of the motor assembly 312 and outside the internal chamber 320. The air outlet 350 can be opened through the second cover 312. Multiple air outlets 350 can be formed in the second cover 312. The heat dissipation fins 314 can be vertical to the second cover 312 and can partially surround each air outlet 350 (as shown in FIG. 17) or completely surround each air outlet 350. As shown in FIG. 17, each air outlet 350 is located between two adjacent heat dissipation fins 314.

When the motor inner workings 330 heat up during operation, the second cover 312 can be heated by the motor inner workings 330 in the internal chamber 320. The heat dissipation fins 314 can provide additional surface area for the second cover 312 to expedite heat dissipation. When the outgoing air 740 exits via the air outlet 350, the outgoing air 740 can absorb heat from the heat dissipation fins 314, and dissipate the heat to external atmosphere. Thus, the heat dissipation fins 314 can be cooled, and further improve cooling effect for the motor assembly 300.

Figure 18:
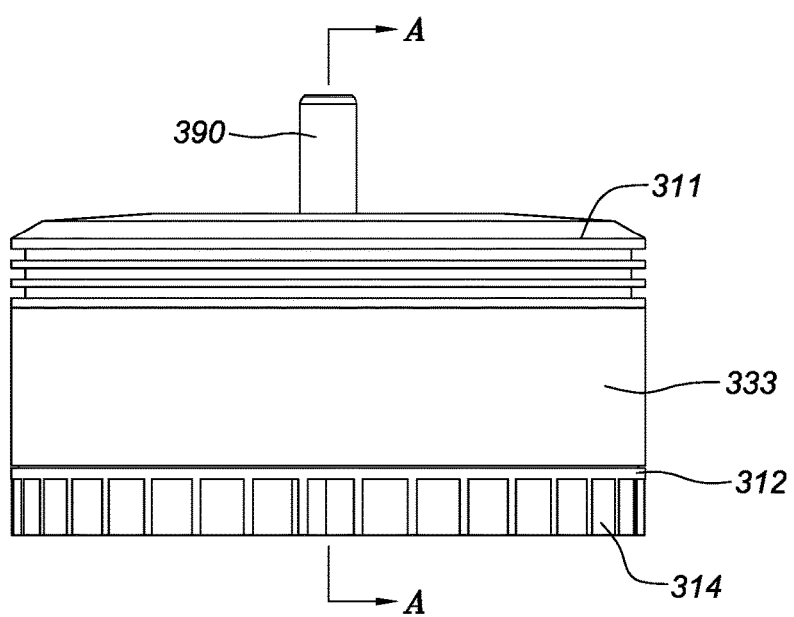
Figure 19:
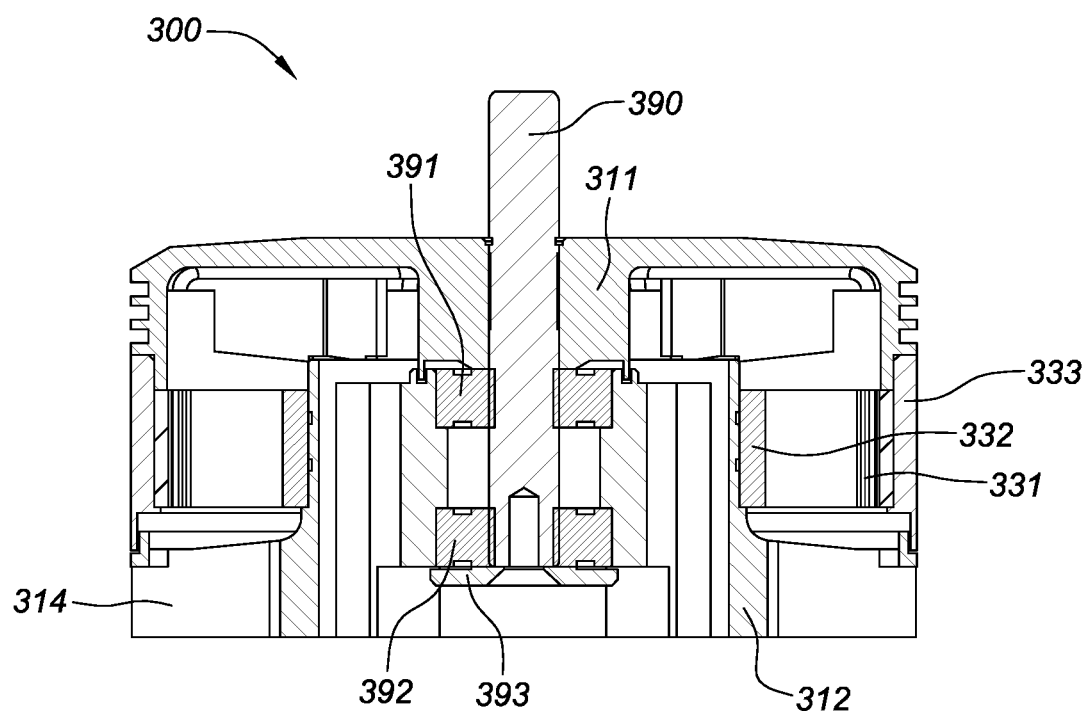

FIG. 18 is a detail drawing of another alternative embodiment of the motor assembly of FIG. 17, wherein a side view of the motor assembly is shown. FIG. 18 illustrates the heat dissipation fins 314 on the second cover 312. FIG. 19 is a detail drawing of an alternative embodiment of the motor assembly of FIG. 17, wherein a cross sectional view of the motor assembly along an A-A plane of FIG. 18 is shown. FIG. 19 illustrates the heat dissipation fins 314 extending from the second cover 312 and extending the total height of the motor assembly 300.

Figure 20:
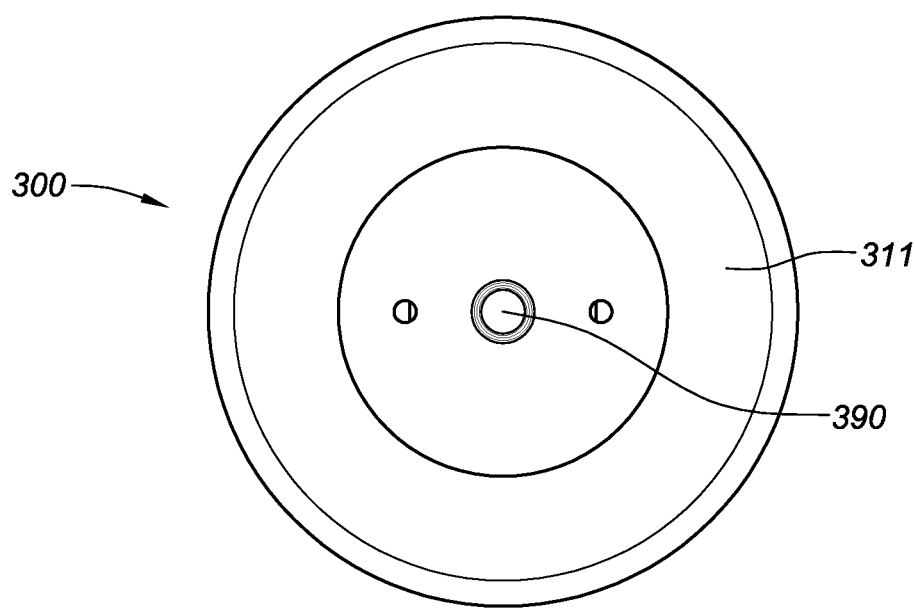
Figure 21:
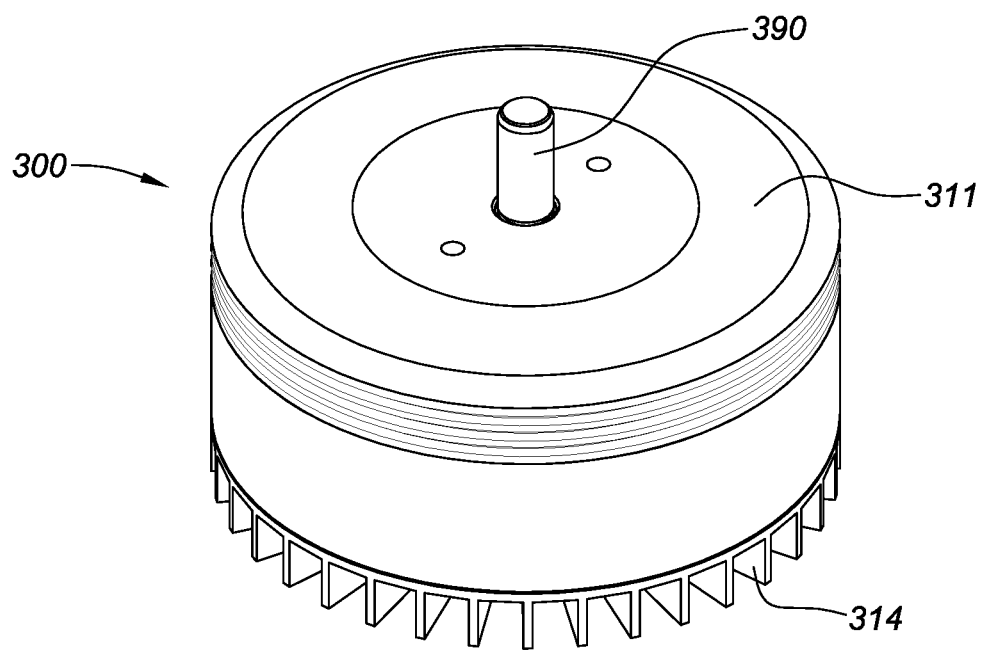
Figure 22:
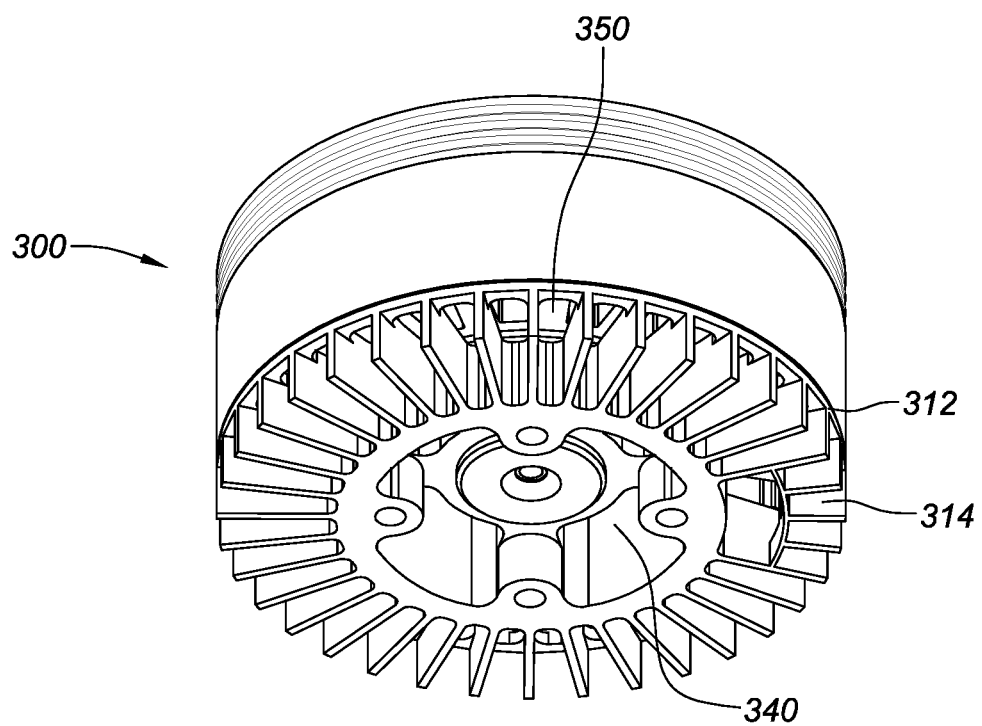

FIG. 20 is a detail drawing of another alternative embodiment of the motor assembly of FIG. 17, wherein a top view of the motor assembly is shown. FIG. 20 illustrates a cover of the motor assembly having a protruding end of the central motor shaft 390. FIG. 21 is a detail drawing of another alternative embodiment of the motor assembly of FIG. 17, wherein a prospective view of the motor assembly is shown. FIG. 21 illustrates the first cover 311. FIG. 22 is a detail drawing of another alternative embodiment of the motor assembly of FIG. 17, wherein a prospective view of the motor assembly is shown from a perspective different the perspective of FIG. 21. FIG. 22 illustrates the second cover 312 having the heat dissipation fins 314 thereon.

Figure 23:
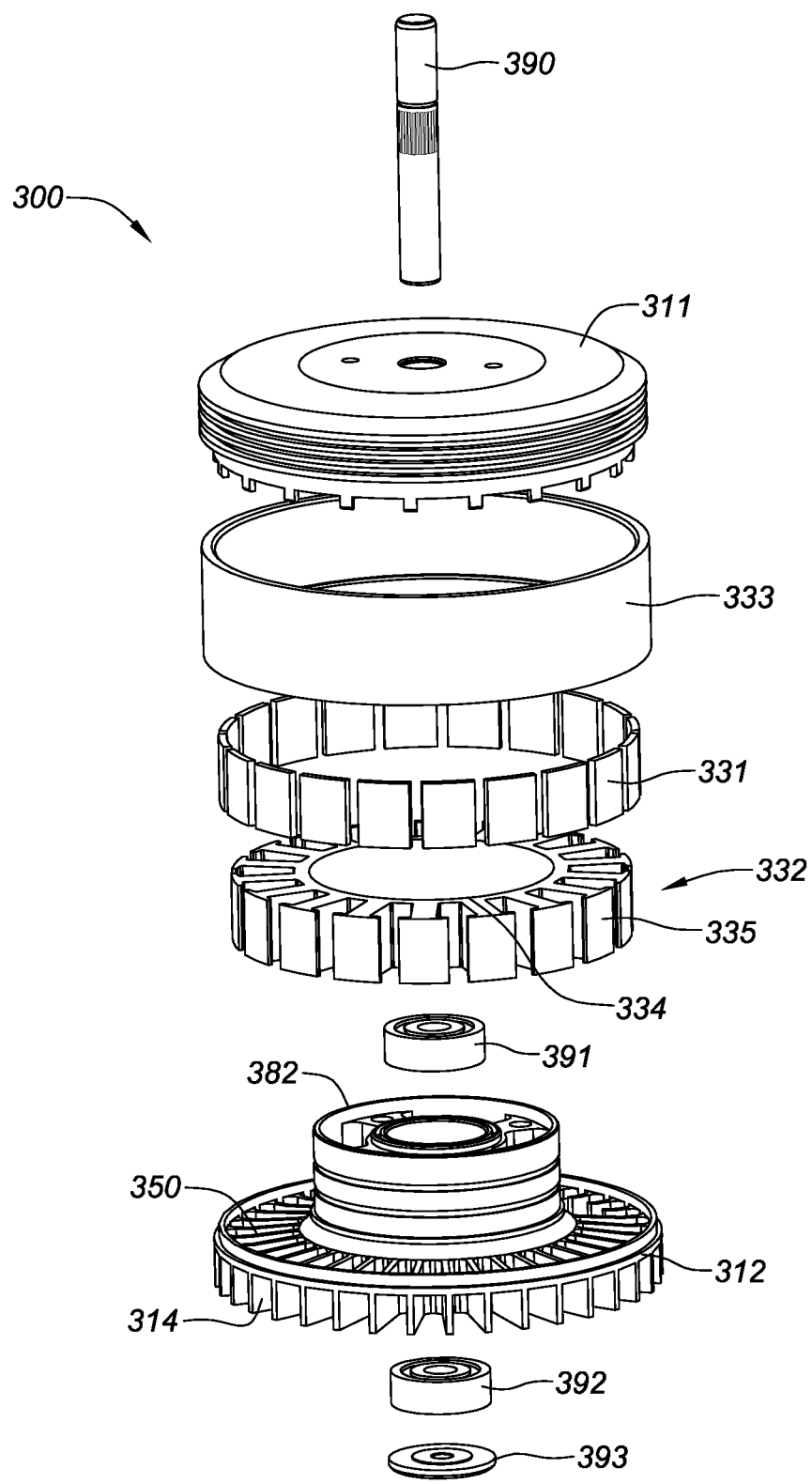

FIG. 23 is a detail drawing of another alternative embodiment of the motor assembly of FIG. 17, wherein an exploded view of the motor assembly is shown. As shown in FIG. 23, the second cover 312 can have multiple air outlets 350. The stator 332 illustrated in FIG. 23 includes the center ring 334 having the plurality of teeth 335 radially extended from the ring 334. The coil can be installed on each tooth 335. When the motor assembly 300 is assembled, each air outlet 350 on the second cover 312 can align with a gap between two adjacent teeth 335, i.e., a gap between adjacent coils. The outgoing air 740 can be pressured into the gap between adjacent coils and exit via the air outlet 350 that is in alignment with the gap.

Figure 24:
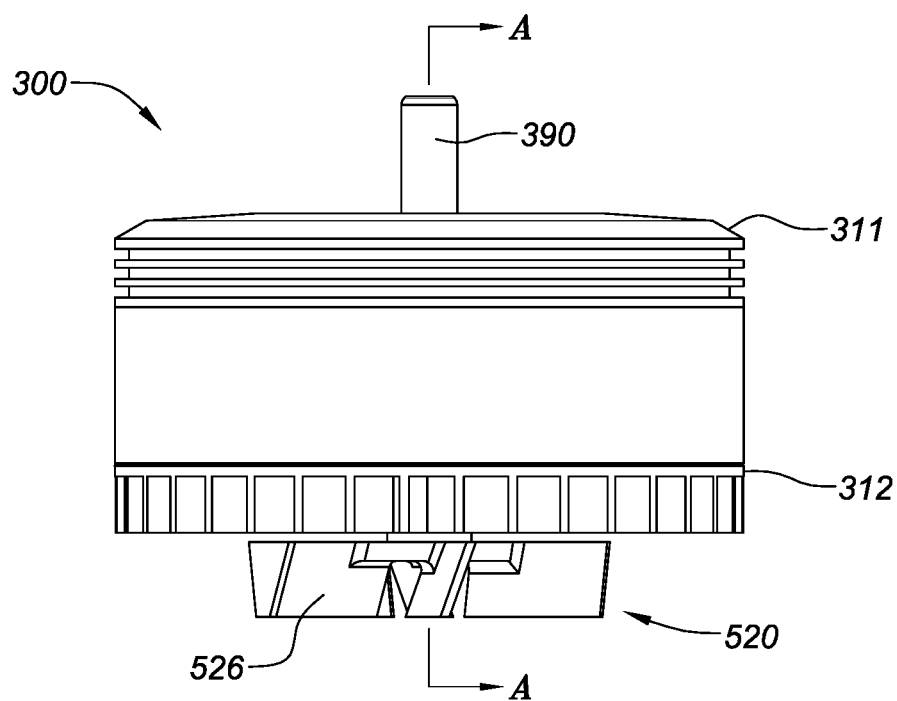
FIGS. 24-28 are detail drawings of another alternative embodiment of the motor assembly of FIG. 2, wherein the motor assembly includes an axial-flow fan.

Further, an air-forcing device can be installed at a location along the air flow 700 (as shown in FIG. 4) to further enhance the directionality and flow rate of the air flow 700. For example, FIG. 24 is a detail drawing of another alternative embodiment of the motor assembly of FIG. 2, wherein a side view of the motor assembly is shown. FIG. 24 illustrates an air-forcing device installed outside the internal chamber 320 and on the second cover 312. The air-forcing device in FIG. 24 includes an axial-flow fan 520. The axial-flow fan 520 can include one or more axial-fan blades 526. Each blade 526 can be radially distributed with respect to the central motor shaft 390.

When the motor assembly 300 operates, the central motor shaft 390 drives the axial-flow fan 520 to rotate. Each blade 526 can be tilted from the second cover 312 at an angle. The angle can be different from 90 degrees, so the rotating axial-flow fan 520 can pressure the central air 720 into the duct 380 and transforming the central air 720 into the incoming air 730. Thus, the rotating axial-flow fan 520 can pressure air axially, i.e., along the direction of the central motor shaft 390.

In various embodiments, the motor assembly 300 can include one or both of the axial-flow fan 520 and the centrifugal fan 510. When the motor assembly 300 includes one or both of the axial-flow fan 520 and the centrifugal fan 510, the motor assembly 300 can generate the air flow 700 (as shown in FIG. 4) effectively for cooling the motor inner workings 330. In other words, the pump structure 500 of the mobile platform 100 can include the axial-flow fan 520 and/or the centrifugal fan 510.

Figure 25:
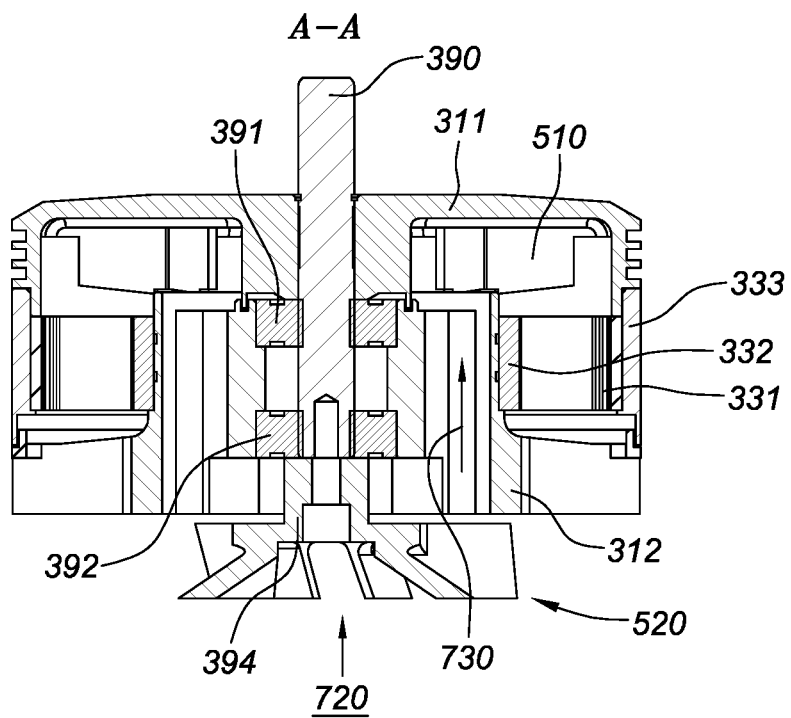

FIG. 25 is a detail drawing of an alternative embodiment of the motor assembly of FIG. 24, wherein a cross-sectional view of the motor assembly along an A-A plane of FIG. 24 is shown. FIG. 25 shows that the central motor shaft 390 has an extended shaft portion 394 beyond the second bearing 392. The extended shaft portion 394 can drive the axial-flow fan 520.

Figure 26:
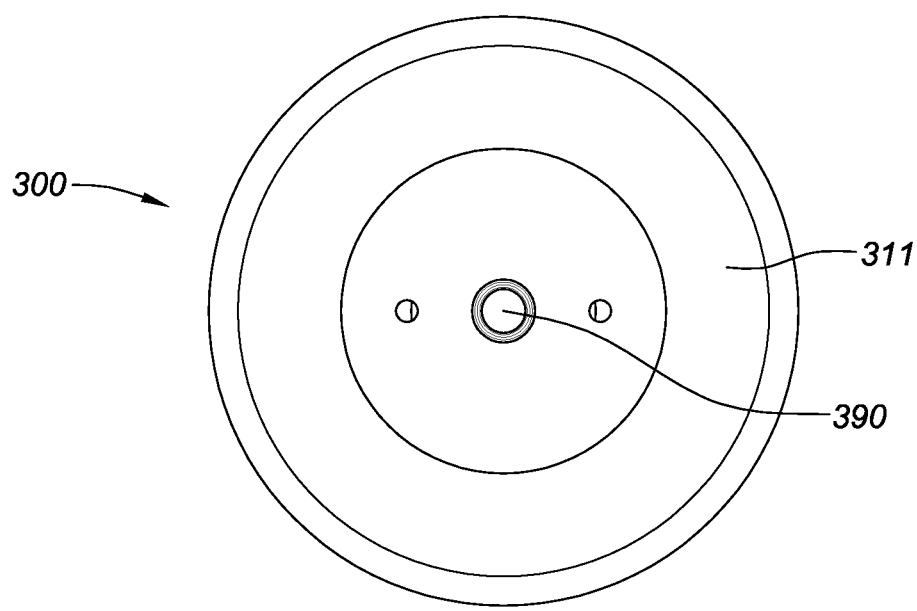
Figure 27:
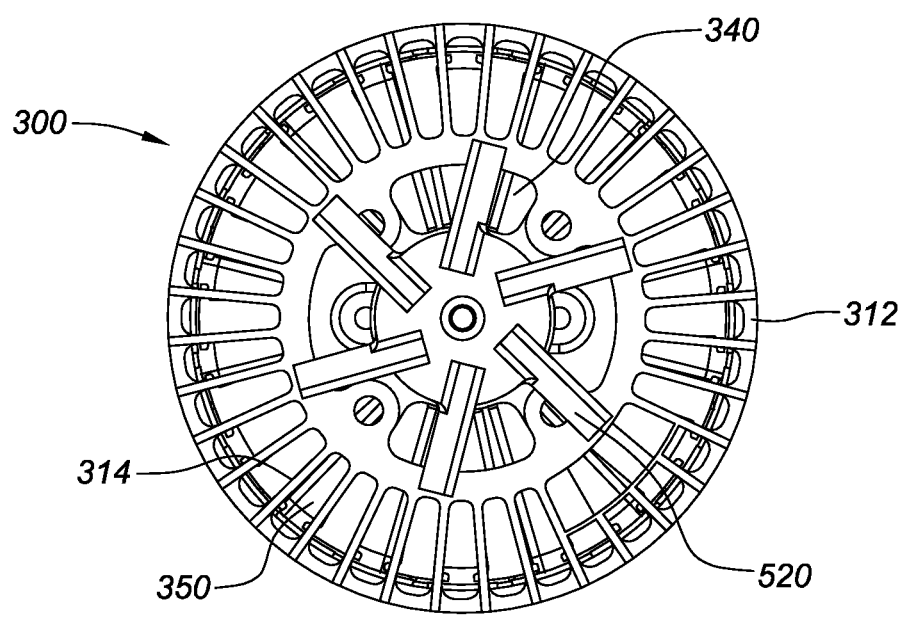
Figure 28:
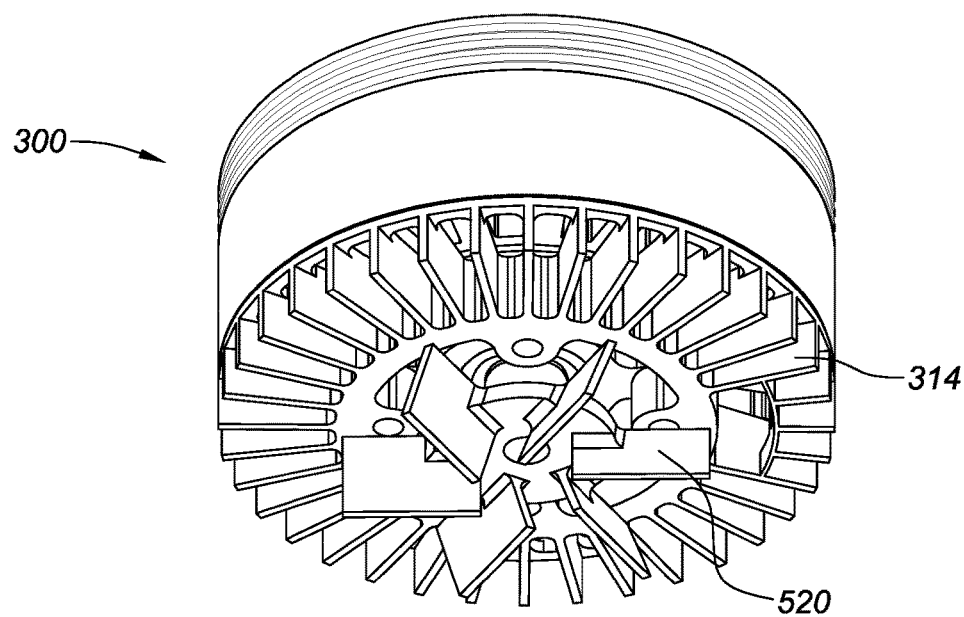

FIG. 26 is a detail drawing of an alternative embodiment of the motor assembly of FIG. 24, wherein a top view of the motor assembly is shown. FIG. 26 illustrates the first cover of the motor assembly having a protruding end of the central motor shaft 390. FIG. 27 is a detail drawing of an alternative embodiment of the motor assembly of FIG. 24, wherein a bottom view of the motor assembly is shown. In FIG. 27, the motor assembly 300 includes the axial-flow fan 520. The coverage of the axial-flow fan 520 during rotation can cover the air inlet 340 on the second cover 312 without blocking the air outlet 350 on the second cover 312. The central air 200 can be forced into the air inlet 340 upon being subjected to the rotating axial-flow fan 520. FIG. 28 is a detail drawing of an alternative embodiment of the motor assembly of FIG. 24, wherein a prospective view of the motor assembly is shown. FIG. 28 further illustrates spatial relationship between the axial-flow fan 520 and the heat dissipation fins 314.

Figure 29:
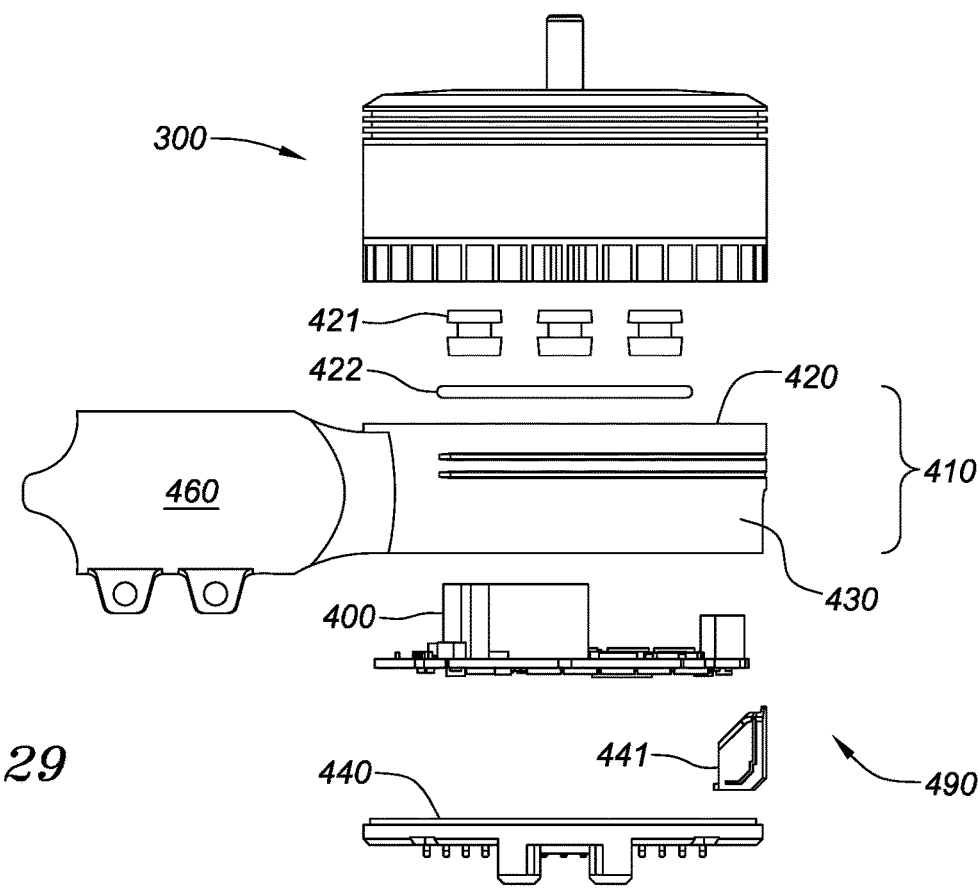
FIGS. 29-32 are detail drawings of an alternative embodiment of the motor assembly of FIG. 2, wherein the motor assembly includes a motor installation base.

As shown in FIG. 4, the mobile platform 100 can further include the motor controller 400 for controlling the motor assembly 300. In various embodiments, the motor controller 400 can be in air sealed space. For example, FIG. 29 is an exploded side view of the motor assembly of FIG. 17. In FIG. 29, the motor assembly 300 is coupled with a motor installation base 490. The motor assembly 300 can be integrated with the motor installation base 490 and include the motor installation base 490. The motor installation base 490 can include a motor base 410. The motor base 410 can have a top base cover 420 and a base sidewall 430. The motor installation base 490 can include a bottom base cover 440. Optionally, a light emitting diode (LED) 441 can be installed on the bottom base cover 440 for purposes including e.g., indicating status of motor operation. The top base cover 420, the base sidewall 430 and the bottom base cover 440 can define an installation chamber 450 (not shown). The motor installation base 490 can further include a hollow base arm 460 connected to the base sidewall 430. The installation chamber 450 can communicate with the hollow base arm 460. The hollow base arm 460 can be connected with other portion (e.g., the air transport duct 600) of the mobile platform to receive the air flow 700.

The motor controller 400 can be installed in the installation chamber 450. One or more isolation pads 421 can be placed between the second cover 312 of the motor assembly 300 and the top base cover 420. The isolation pad 421 can be used for absorbing shock generated by relative movement of the motor installation base 490 and the motor assembly 300, and protect the motor assembly 300 from vibrations of the mobile platform 100.

The isolation pad 421 can further be used for thermally insulating the installation chamber 450 from the motor inner workings 330. Thus, the devices (e.g., motor controller 400) in the installation chamber 450 can be protected from the heat generated by the motor inner workings 330. The isolation pad 421 can be made of any material that has a damping property and thermally insulating, including, e.g., silicone.

Further, a sealing member 422 (e.g., O-ring) can be placed between the second cover 312 of the motor assembly 300 and the top base cover 420, to seal any air gap existing between the motor assembly 300 and the motor installation base 490. Thus, the central air 720 entering the installation chamber 450 can travel into the internal chamber 320 of the motor assembly 300 without leaking out via the air gap between the motor assembly 300 and the motor installation base 490.

Figure 30:
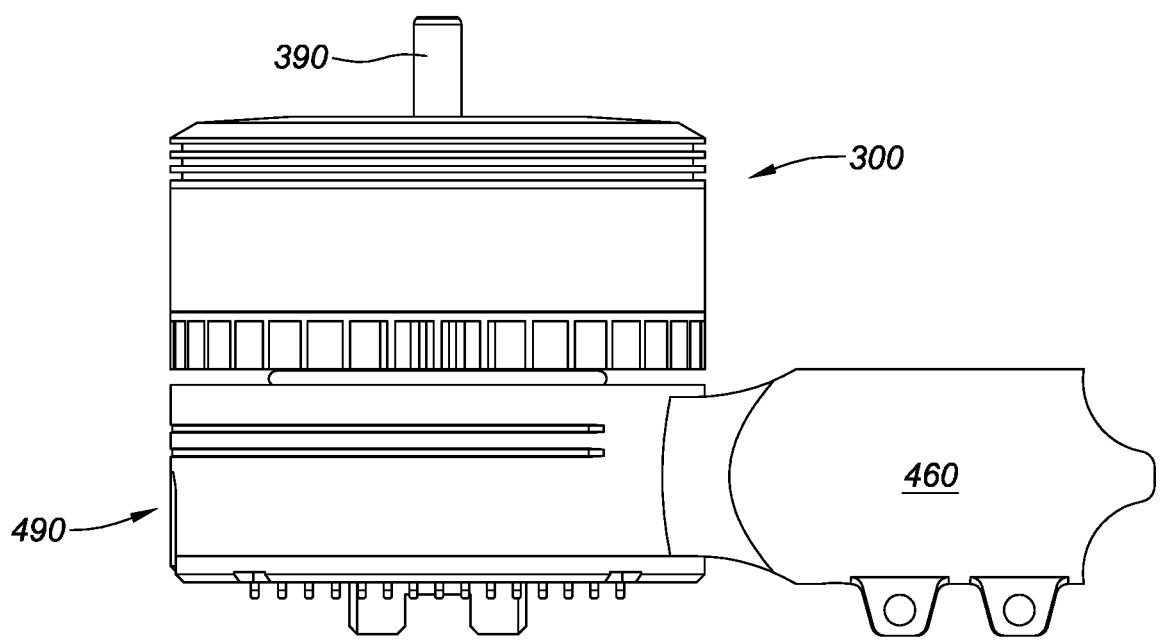

FIG. 30 is a detail drawing of another alternative embodiment of the motor assembly of FIG. 29, wherein a side view of the motor assembly is shown. FIG. 30 illustrates the motor assembly 300 as installed on the motor installation base 490, with the sealing member 422 sandwiched in between. The motor assembly 300 can be installed on the motor installation base 490 when the mobile platform in an operation position and/or a landing position.

Figure 31:
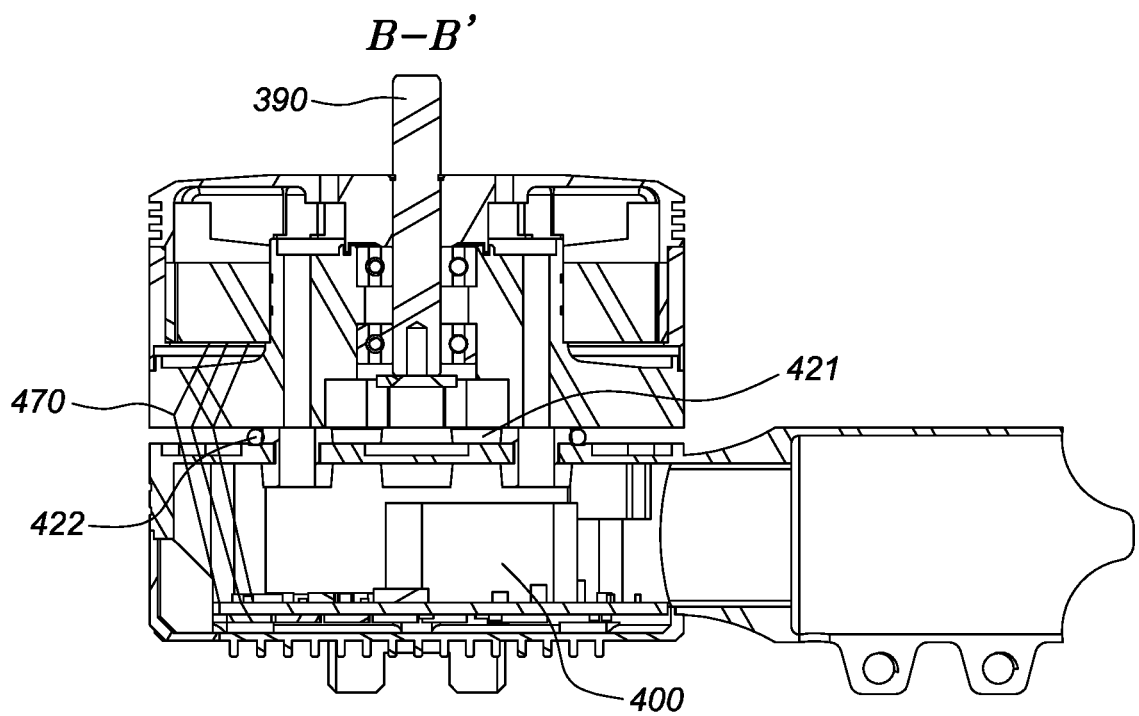

FIG. 31 is a detail drawing of another alternative embodiment of the motor assembly of FIG. 29, wherein a cross-sectional side view of the motor assembly is shown. The motor assembly 300 is assembled with the motor installation base 490. The motor controller 400 can be connected to the motor inner workings 330 via a wire or wirelessly. FIG. 31 illustrates one or more wires 470 connecting the motor controller 400 and the motor inner workings 330 (e.g., connecting to coils of the stator 332). The wire 470 can pass through a wire slot 423 (not shown) opened on the top base cover 420, and extend into the internal chamber 320 via the air outlet 350, to be connected to the motor inner workings 330. Sealing material can be applied to fill air gap in the wire slot 423 having the wire 470 passing through, to air seal the wire slot 423.

In certain embodiments, the top base cover 420 does not have the wire slot 423 opened thereon. In that case, a wire slot can opened at any suitable locations. For example, a wire slot can be opened on the base sidewall 430 (not shown). Further, the wire 470 can pass through the air inlet 340, to be connected to the motor inner workings 330.

Figure 32:
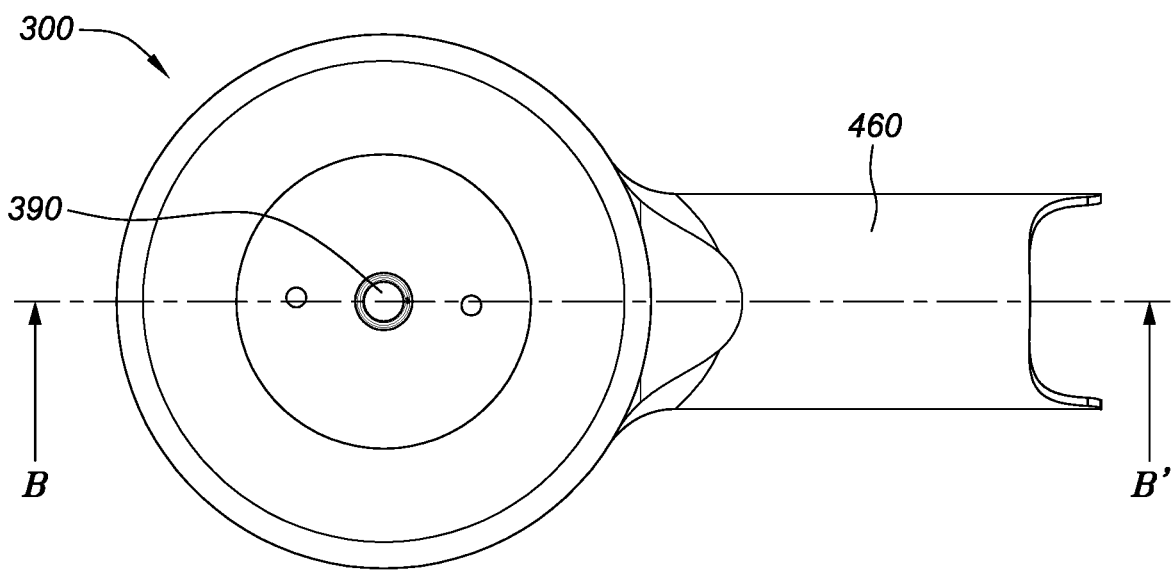

FIG. 32 is a detail drawing of another alternative embodiment of the motor assembly of FIG. 29, wherein a top view of the motor assembly is shown. The motor assembly 300 is assembled with the motor base 490. FIG. 32 shows a cover of the motor assembly 300 having a protruding end of the central motor shaft 390. FIG. 32 further illustrates a B-B' plane for indicating the position of the cross-sectional view in FIG. 31.

Figure 33:
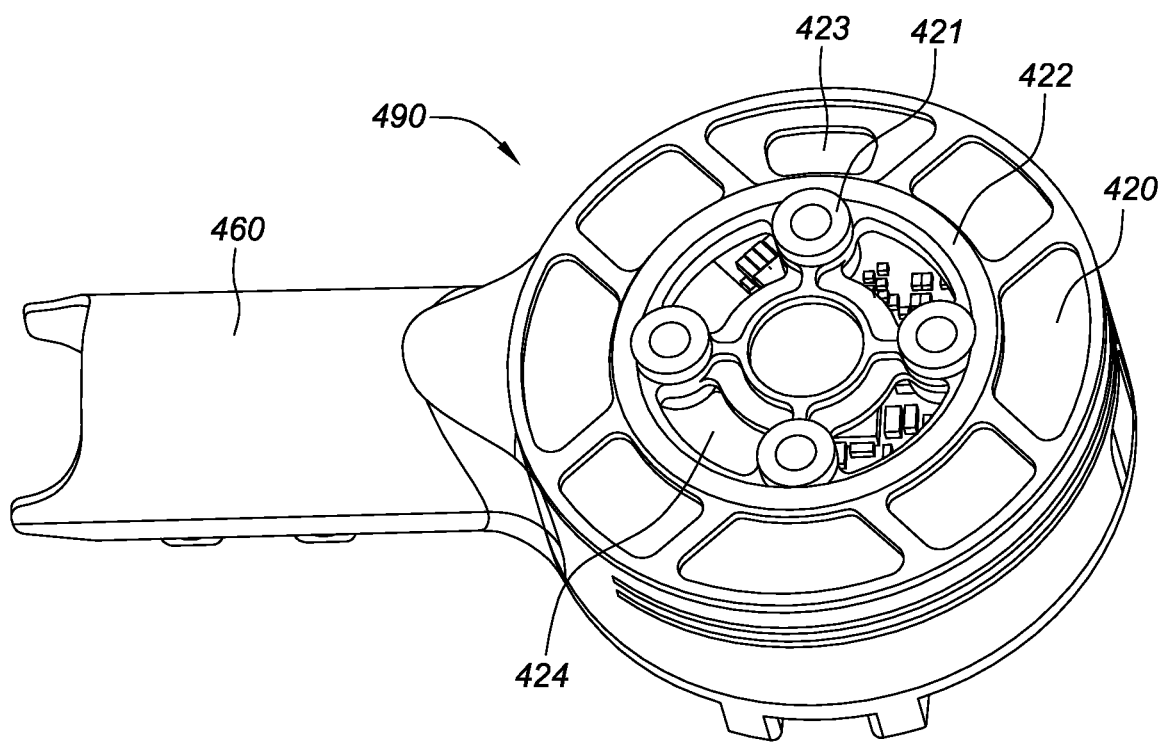
FIG. 33 is a detail drawing of an alternative embodiment of the motor installation base of FIG. 29, wherein a prospective view of the motor installation base is shown.

FIG. 33 is a detail drawing of an alternative embodiment of the motor installation base of FIG. 29, wherein a prospective view of the motor installation base is shown. FIG. 33 illustrates the top base cover 420 as having the isolation pads 421 and the sealing member 422 thereon. The top base cover 420 has the wire slot 423 for wires 470 to pass through. The top base cover 420 has one or more base air outlets 424 so the central air 200 in the installation chamber 450 can enter the air inlets 340 of the motor assembly 300.

Figure 34:
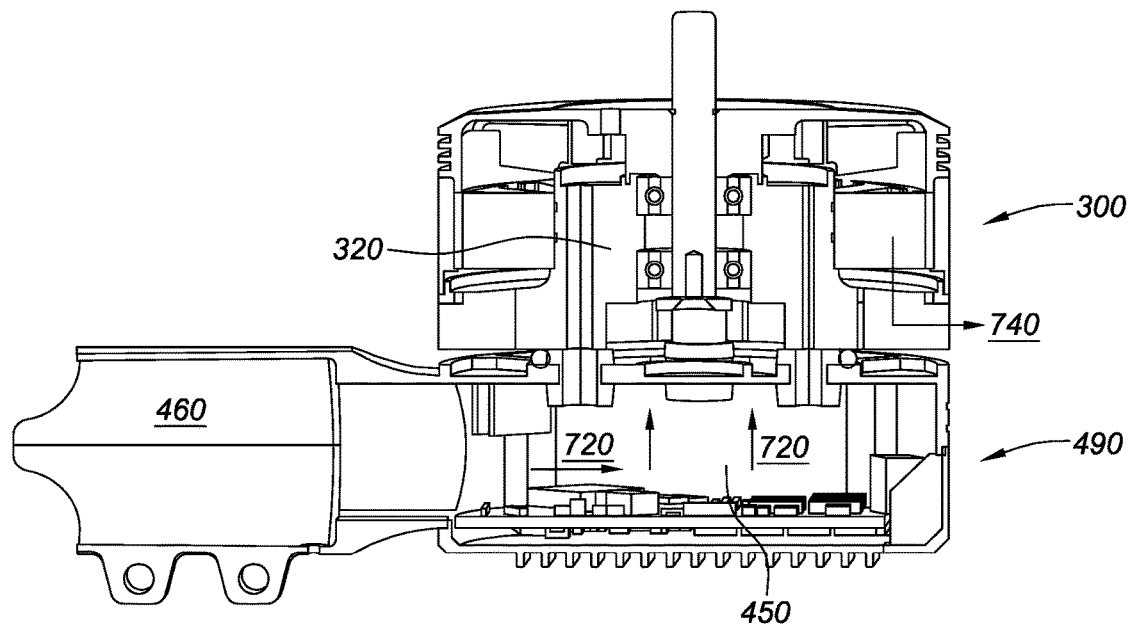
FIG. 34 is a detail drawing of another alternative embodiment of the motor assembly of FIG. 29, wherein a cross-sectional side view of the motor assembly is shown.

FIG. 34 is a detail drawing of another alternative embodiment of the motor assembly of FIG. 29, wherein a cross-sectional side view of the motor assembly is shown. FIG. 34 illustrates the motor assembly 300 as being assembled with the motor installation base 490. The cross sectional view of the motor assembly 300 and the motor installation base 490 is shown for illustrating the internal chamber 320 and the installation chamber 450 (the motor controller 400 is not shown). The central air 720 can enter the installation chamber 450 via the hollow base arm 460 and then enter the duct 380 in the motor assembly 300 to become the incoming air 730 and then be centrifuged to become the outgoing air 740 to exit via the air outlet 350.

Thus, according to FIGS. 29-34, the central air 720 entering the installation chamber 450 can first cool the motor controller 400 in the installation chamber 450 and then cool the motor inner workings 330 in the motor assembly 300. The motor controller 400 generally has a lower temperature than the motor inner workings 330 during an operation, so the central air 200 can still have a lower temperature than the motor inner workings 330. After the central air 720 is transformed into the incoming air 730 and then the outgoing air 740, the incoming air 730 and/or the outgoing air 740 can cool the motor inner workings 330.

Conventionally, the motor controller is installed outside a housing and exposed to external environment of a mobile platform. According to the disclosed embodiments, the motor controller 400 can be air-sealed in the installation chamber 450 and thus be protected from external atmosphere. Clean and cool air flow 720 can cool the motor controller 400, so operation safety and lifetime of the motor controller 400 can be improved.

Figure 35:
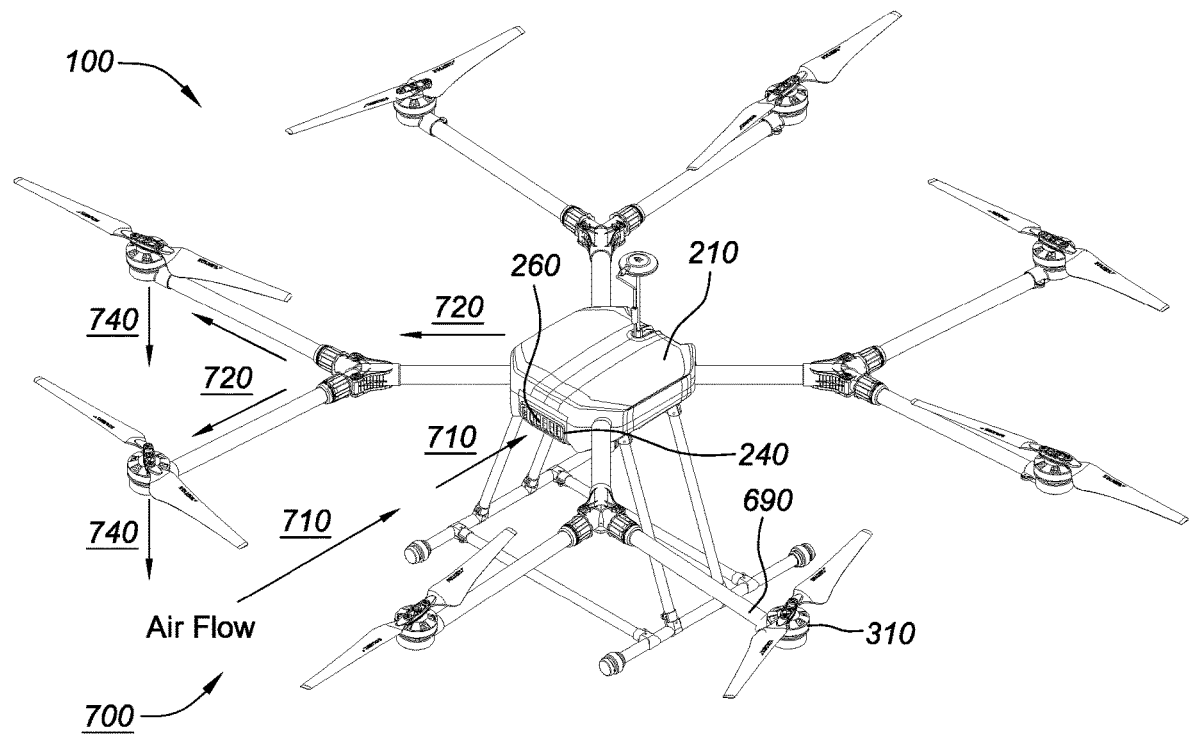
FIG. 35 is a detail drawing of an alternative embodiment of the mobile platform of FIG. 4, wherein a prospective view of the mobile platform is shown.

FIG. 35 is a detail drawing of an alternative embodiment of the mobile platform 100 of FIG. 4, wherein a prospective view of the mobile platform is shown. As shown in FIG. 35, the central housing 210 can be connected with the motor housing 310 of the motor assembly 300 via a motor arm 690. The motor arm 690 can be the same as, or enclose, a portion of the air transport duct 600 as shown in FIG. 4. The motor arm 690 can include a hollow structure, and/or be made of a porous material.

In one embodiment, the motor arm 690 can constitute at least a portion of the air transport duct 600. As shown in FIG. 4, the air transport duct 600 forms a passage for the central air 720 between the central chamber 220 and the internal chamber 320. In FIGS. 29-34, the motor assembly 300 is coupled with the motor installation base 490. Thus, the motor arm 690 can be connected to the hollow base arm 460. Thus, the central air 720 can sequentially traverse the motor arm 690, the hollow base arm 460, and the installation chamber 450 of the motor installation base 490. The central air 720 can then enter the internal chamber 320. In that case, the air transport duct 600 can include the motor arm 690, the hollow base arm 460, and the motor installation base 490.

Thus, when the motor assembly 300 is coupled with the motor installation base 490 as shown in FIGS. 29-34, air passage defined by the air transport duct 600 can include space within the motor arm 690, the hollow base arm 460, and the motor installation base 490.

Figure 36:
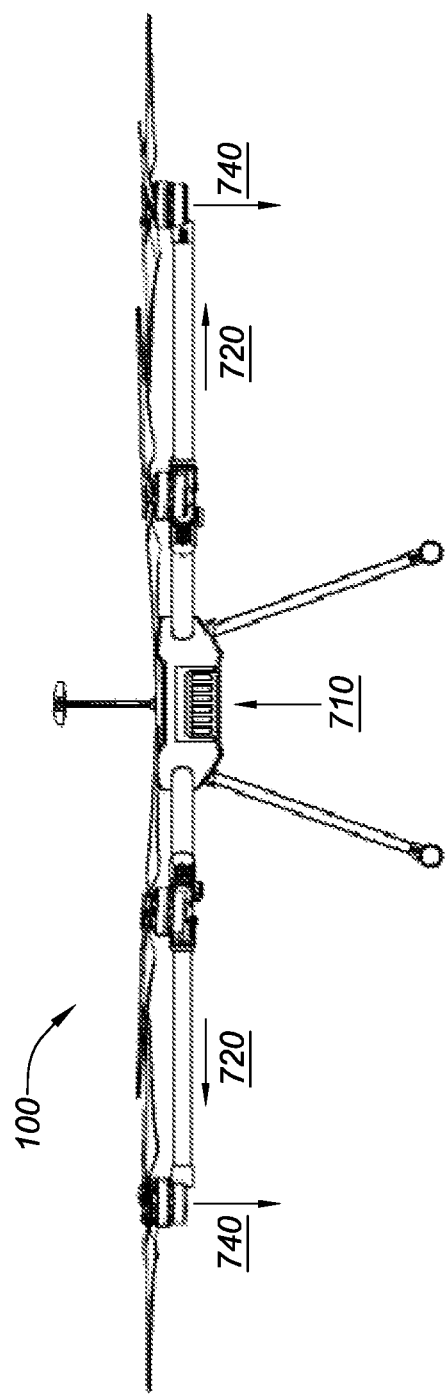
FIG. 36 is a detail drawing of another alternative embodiment of the mobile platform of FIG. 4, wherein a front view of the mobile platform is shown.

The environmental air 710 can enter the mobile platform 100 via the central air inlet 240. The central air inlet 240 can be covered by the filter 260 for filtering the environmental air 710. The environmental air 710 can first enter the central chamber 220 and be transformed into the central air 720 to cool the control device 230 (not shown) in the central housing 210. The central air 720 can then flow to the motor assembly 300 via the motor arm 690. As shown in FIG. 35, the central air 720 enters the motor installation base 490 before entering the motor assembly 300. In the motor assembly 300, the incoming air 730 (not shown) travels in the motor assembly 300 in a direction toward the propellers, to be centrifuged and transformed into the outgoing air 740. The outgoing air 740 can be pressured toward the air outlet, as shown by the arrows in FIG. 35, to exit from the motor assembly 300 into the external environment of the mobile platform 100. FIG. 36 is a detail drawing of another alternative embodiment of the mobile platform of FIG. 4, wherein a front view of the mobile platform is shown. FIG. 36 further illustrates the air flow 700 in more details.

Thus, by creating the directional air flow 700, the disclosed motor assembly 300 can cool both of the control device 230 and the motor inner workings 330. The mobile platform 100 can be structured as FIG. 35 illustrates, so only clean and cool air flows within the air sealed mobile platform 100. The mobile platform 100 can thus be lightweight, have desired heat dissipation, and have strong resistance to dust, moist, and corrosion.

Thus, various embodiments disclose a system for dissipating heat generated by a motor assembly. The system can include the motor assembly disclosed in various embodiments. Examples of the motor assembly are as shown in FIGS. 5-34. Various embodiments further disclose a mobile platform. The mobile platform can include the motor assembly as shown in FIGS. 5-34. The mobile platform can include a UAV.

Various embodiments disclose a method for manufacturing a motor assembly. The method can include forming the motor assembly as shown in FIGS. 5-34.

Various embodiments also provide a kit for assembling a mobile platform. The kit can include one or more of the control device assembly and/or the control device 230, the motor arm 690, and the motor assembly 300 as illustrated in FIGS. 1-34 and 37. The kit can be used for assembling the mobile platform 100 instead of acquiring a factory-assembled mobile platform. In certain embodiments, an instruction manual can be included in the kit. The instruction manual may have instructions thereon. When the instructions are followed, the control device assembly and/or the control device 230, the motor arm 690, and the motor assembly 300 can be assembled into the motor assembly 300 and/or the mobile platform 100 as shown in the present disclosure.

Although in various embodiments (e.g., FIG. 12), the stator 332 of the motor inner workings 330 is located in the outer cavity 370 of the internal chamber 320 and surround the duct 380, the stator 332 can be located inside the inner cavity 360 of the internal chamber 320 and within the duct 380. That is, the incoming air 730 can cool the stator 332. Arrangement of portion of the motor inner workings 330 in the inner cavity 360 and the outer cavity 370 can vary depending on specific design of the motor inner workings 330, without limitation.

Although FIG. 12 illustrates the rotor 331 as surrounding the stator 332, rotor 331 surrounding the stator 332 is not essential for implementing the method, apparatus, and kit in the present disclosure. The motor inner workings 330 can have the stator 332 surrounding the rotor 331, without limitation.

Although in various embodiments (e.g., FIG. 12), the blade 516 of the centrifugal fan 510 is fixed on the first cover 311, the blade 516 of the centrifugal fan 510 can be separated from the first cover 311 by a gap according to other embodiments. In that case, the first cover 311 can be either stationary or rotating during operation of the motor inner workings 330. The centrifugal fan 510 can be connected to the central motor shaft 390 for operation. In another example, the sidewall 313 (as shown in FIG. 3) does not necessarily contact the rotor 331, and can thus be stationary instead of rotating with the rotor 331. Therefore, whether a specific portion of the housing 310 is stationary or rotatable can be varied depending on specific connection between various portions of the housing 310 and the motor inner workings 330, and is not limited in the present disclosure.

Although FIG. 1 illustrates the control device assembly 200 as including the control device 230 therein, the control device assembly 200 does not necessarily include the control device 230. Further, the control device assembly 200 can accommodate any device besides the control device 230, and can represent any assembly from which the motor assembly 300 can draw central air 200. The terms of "control device assembly 200", "central chamber 220", "central air 230" are illustrative only, and are not necessarily associated with the control device 230 or located at the center of the mobile platform 100.

Figure 37:
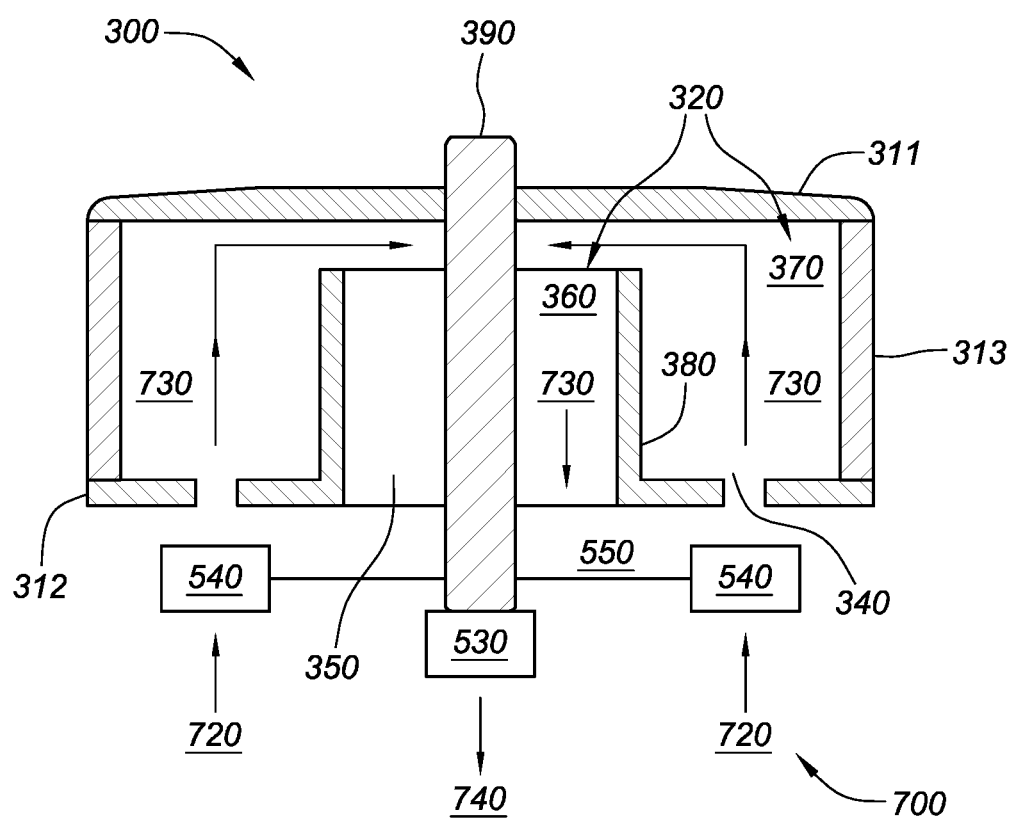
FIG. 37 is an exemplary diagram illustrating another alternative embodiment of the motor assembly of FIG. 2, wherein the motor assembly includes an inner cavity in communication with an air outlet and an outer cavity in communication with an air inlet.

Returning to FIG. 5, the inner cavity 360 is in communication with the air inlet 340, and the outer cavity 370 is in communication with the air outlet 350. However, the disclosed methods, apparatuses and kits are not limited to the illustrations in FIG. 5. For example, FIG. 37 is an exemplary diagram illustrating another alternative embodiment of the motor assembly 300. FIG. 37 illustrates an exemplary cross-sectional view of the motor assembly 300. In the example shown in FIG. 37, the portion of the internal chamber 320 within the duct 380 can be the inner cavity 360, and/or the portion of the internal chamber 320 outside the duct 380 can be the outer cavity 370. In other words, a sidewall of the duct 380 can form a spacer for separating the inner cavity 360 from the outer cavity 370. As shown in FIG. 37, the inner cavity 360 is in communication with the air outlet 350, and the outer cavity 370 is in communication with the air inlet 340.

The motor assembly 300 can include a first pump 530. For example, the first pump 530 can include a fan (not shown) with one or more blades (not shown) extending radially from the central motor shaft 390. During operation of the motor assembly 300, the fan can be driven by the central motor shaft 390 to rotate. The first pump 530 can draw air from the internal chamber 320 and pressure the air to exit the internal chamber 320 via the air outlet 350.

The internal chamber 320 can communicate with the central chamber 220 (not shown) via the air inlet 340. The first pump 530 can draw the central air 720 into the internal chamber 320. The central air 720 can thus be transformed into the incoming air 730. The incoming air can traverse the internal chamber 320 and flow toward the air outlet 350. Once exposed to the fan 530, the incoming air 730 can be expelled by the first pump 530 and be pressured out of the internal chamber 320 via the air outlet 350.

Additionally and/or alternatively, the motor assembly 300 can include a second pump 540 outside the internal chamber 320 and adjacent to the air inlet 340. The pump 540 can include a fan (not shown) with one or more blades (not shown). At least one blade of the fan is not necessarily connected to the central motor shaft 390. The pump 540 can include a fan shaft (not shown) that can be coupled with the central motor shaft 390 via a gear 550. The blade can be connected to the fan shaft of the pump 540. When the central motor shaft 390 rotates, the central motor shaft 390 can drive the fan shaft to rotate and thus operate the pump 540. The blade of the first pump 530 and the second pump 540 can have angle and/or shape designed in such a way that the first pump 530 can draw air from the internal chamber 320 and the second pump 540 can pressure air into the internal chamber 320.

In FIG. 5, the air flow 700 in the internal chamber 320 can flow away from the central motor shaft 390. In FIG. 37, the air flow 700 in the internal chamber 320 can flow toward the central motor shaft 390. In FIG. 5, directions of the air flow 700 in the inner cavity 360 and the outer cavity 370 are different and/or opposite. In FIG. 37, directions of the air flow 700 in the inner cavity 360 and the outer cavity 370 are different and/or opposite. The duct 380 can function as an obstacle to force the air flow 700 to flow in a route other than a straight line. Therefore, in FIG. 5 and FIG. 37, the air flow 700 can traverse the internal chamber 320 circuitously. That is, the direction of the air flow 700 traversing the internal chamber 320 is not necessarily a straight line. Thus, the internal chamber 320 can retain the air flow 700 for a long time. The air flow 700 can be more fully utilized for cooling the motor assembly 300.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for dissipating heat in a mobile platform, the mobile platform including:
   a central housing, an air transport duct and a housing,
   the central housing hosting a control device for the mobile platform, the housing including a motor assembly,
the air transport duct including a motor installation base,
the motor assembly providing movement propulsive force for the mobile platform and comprising a pump structure and defining an internal chamber for at least partially receiving motor inner workings of the motor assembly,
the motor installation base at least partially receiving a motor controller,
the internal chamber communicating with an air inlet and an air outlet each being formed in the housing,
the method comprising:
enabling the motor inner workings and pump assembly to operate;
drawing air into the internal chamber from the central housing associated with the mobile platform via said enabling and through the air transport duct, wherein the central housing and the control device for the mobile platform are in a location different from and external to the housing of the internal chamber, separated by a distance in a horizontal direction with respect to a central motor shaft of the motor inner workings, and in air communication with the internal chamber through the air transport duct, and wherein the air transport duct joins the internal chamber from outside of the housing from the motor installation base through an opening on a sidewall of the motor installation base;
enabling the internal chamber to direct the air flow of a first direction passing from the motor controller in the motor installation base and to turn to the motor inner workings in a second direction;
expelling the air from the internal chamber via said enabling,
wherein:
the first direction is different from the second direction, and
the motor inner workings are cooled by the air traversing from the air inlet to the air outlet after the air passing by the control device to cool the control device in the central housing, the air passing by the motor controller in the motor installation base to cool the motor controller and entering the internal chamber through the motor installation base of the air transport duct.

2. The method of claim 1, wherein said enabling comprises:
rotating a rotor of the motor inner workings with respect to an axis defined by the central motor shaft at a center of the motor inner workings; and
rotating a centrifugal fan of the pump assembly in the internal chamber coaxially with the rotor for drawing the air into the internal chamber and expelling the air from the internal chamber.

3. The method of claim 2,
wherein said drawing comprises drawing the air into an inner cavity defined by a duct extending into the internal chamber and communicating with the air inlet, and
wherein said expelling comprises expelling the air from the inner cavity into an outer cavity being formed outside the duct and within the internal chamber and communicating with the air outlet.

4. A motor assembly, comprising:
a central motor shaft for defining a rotating axis of motor inner workings; and
a housing defining an internal chamber for at least partially receiving the motor inner workings, wherein:
the internal chamber communicates with an air inlet and an air outlet each being formed in the housing, wherein the internal chamber is in air communication with an air transport duct connected to an external housing hosting a control device such that air from the external housing flows to the air inlet through the air transport duct to dissipate heat from the motor inner workings during operation, after the air passing by the control device to cool the control device in the external housing and entering the internal chamber though through the air transport duct,
the housing comprises a duct in the internal chamber for defining an inner cavity within the duct and surrounding the central motor shaft and an outer cavity outside the duct, inside the internal chamber and surrounding the inner cavity, and
a stator of the motor inner workings is located in the outer cavity and surrounds the duct,
wherein the motor assembly further comprises a pump structure for drawing air into the internal chamber via the air inlet and expelling the air out of the internal chamber via the air outlet,
the pump structure comprises a centrifugal fan exposed to the duct and the centrifugal fan comprises at least one blade rotatable with respect to the central motor shaft, and
the blade comprises a planar structure facing a direction vertical to the central motor shaft, wherein the planar structure comprises a wide portion and two narrow portions radially separated by the wide portion, the wide portion extending farther along the rotating axis of the motor inner workings than that of the two narrow portions, a first narrow portion and a second narrow portion, wherein the first narrow portion extends from the central motor shaft to the wide portion, and the second narrow portion is radially separated from the first narrow portion by the wide portion.

5. The motor assembly of claim 4, wherein the motor inner workings are cooled by the air traversing from the air inlet to the air outlet.

6. The motor assembly of claim 5, further comprising an air-forcing device configured to pressure exterior air outside the housing into the internal chamber via the air inlet.

7. The motor assembly of claim 4, wherein the duct has a first opening communicating with the air inlet and a second opening within the internal chamber, and wherein the pump structure is configured to drive the air to flow from the inner cavity to the outer cavity for the air to traverse from the air inlet to the air outlet.

8. The motor assembly of claim 7, wherein the centrifugal fan is exposed to the second opening of the duct.

9. The motor assembly of claim 4, wherein the second opening of the duct fits into space defined by an edge of the wide portion facing the central motor shaft.

10. An unmanned aerial vehicle (UAV), comprising:
the motor assembly of claim 4; and
the external housing which coupled to the housing via a motor arm, wherein the air transport duct is inside the motor arm.

11. An unmanned aerial vehicle (UAV), comprising:
a motor arm coupled with a motor assembly comprising a pump structure, via a motor installation base, for supporting the motor assembly of the UAV, the motor arm being hollow and forming an air transport duct, the motor arm being external to the motor installation base; and a control device assembly coupled with the motor assembly via the motor arm, wherein the control device assembly is in a first housing and the motor assembly is in a second housing, the first housing is external to the motor assembly and the second housing, separated by a distance in a horizontal direction with respect to a center shaft of the motor assembly, and the first housing and the second housing are in air communication through the air transport duct, wherein the motor installation base is coupled to the motor assembly by a sealing member to seal an air gap between the motor installation base and the second housing, and the motor arm joins the motor installation base from outside of the motor installation base and through an opening on a sidewall of the motor installation base, such that the air transport duct of the motor arm connects to the second housing, and wherein the motor assembly is configured to:

provide a movement propulsive force for the UAV, draw air from the first housing with the control device assembly of the UAV to the second housing with the motor assembly via the air transport duct of the motor arm such that the air passing by the control device assembly to dissipate heat from the control device assembly in the first housing before entering the second housing via the air transport duct to the motor assembly in the second housing during operation, and enable the UAV to move in accordance with instructions received from the control device assembly.

12. The UAV of claim 11, wherein the motor assembly comprises:

motor inner workings; and the second housing defines an internal chamber for at least partially receiving the motor inner workings and communicating with an air inlet and an air outlet each being formed in the second housing.

13. The UAV of claim 12, wherein the motor assembly comprises the pump structure for drawing the air into the internal chamber via the air inlet and expelling the air out of the internal chamber via the air outlet, wherein the motor inner workings are cooled by the air traversing from the air inlet to the air outlet.

14. The UAV of claim 13, wherein the motor assembly is configured to simultaneously provide the movement propulsive force for the UAV and operate the pump structure.

15. The UAV of claim 12, wherein the air traversing from the control device assembly to the motor assembly via the motor installation base.

16. The UAV of claim 15, wherein the motor installation base defines an installation chamber therein for receiving a motor controller coupled with the motor assembly, and the installation chamber has air-sealed communication with the internal chamber of the motor assembly via the sealing member.

17. The UAV of claim 11, wherein the first housing defines a central chamber for at least partially receiving the control device assembly and communicating with a central air inlet and a central air outlet each being formed in the first housing.

18. The UAV of claim 17, wherein the air enters the UAV via the central air inlet, traverses the central air outlet, the motor arm, the motor installation base, and an air inlet of the motor assembly, and exits the UAV via an air outlet of the motor assembly.

* * * * *